(12) United States Patent
Hosoe

(10) Patent No.: US 7,686,988 B2
(45) Date of Patent: Mar. 30, 2010

(54) METHOD OF FORMING A DIE SURFACE TO PRODUCE AN OPTICAL ELEMENT

(75) Inventor: Shigeru Hosoe, Hachioji (JP)

(73) Assignee: Konica Minolta Holdings, Inc., Tokyo (JP)

( * ) Notice: Subject to any disclaimer, the term of this patent is extended or adjusted under 35 U.S.C. 154(b) by 1046 days.

(21) Appl. No.: 10/721,547

(22) Filed: Nov. 26, 2003

(65) Prior Publication Data

US 2004/0113299 A1    Jun. 17, 2004

(30) Foreign Application Priority Data

Nov. 29, 2002   (JP)   ............................. 2002-347850
Apr. 8, 2003    (JP)   ............................. 2003-104071

(51) Int. Cl.
*B29D 11/00*   (2006.01)
*B23B 3/00*    (2006.01)

(52) U.S. Cl. .................. 264/2.5; 264/1.32; 264/39; 264/162; 264/219; 264/337; 82/1.11; 407/113

(58) Field of Classification Search ................ None
See application file for complete search history.

(56) References Cited

U.S. PATENT DOCUMENTS

| | | | | |
|---|---|---|---|---|
| 5,008,002 A | * | 4/1991 | Uno et al. ................... 427/530 |
| 5,078,551 A | * | 1/1992 | Oomen ....................... 407/119 |
| 5,171,348 A | * | 12/1992 | Umetani et al. .......... 65/374.11 |
| 5,638,212 A | * | 6/1997 | Meyers et al. ............... 359/569 |
| 5,861,114 A | * | 1/1999 | Roffman et al. ............... 264/2.5 |
| 5,887,048 A | * | 3/1999 | Sata et al. ....................... 378/84 |
| 6,597,510 B2 | * | 7/2003 | Bunkenburg et al. ........ 359/620 |
| 6,758,640 B2 | * | 7/2004 | Mizutani et al. ............ 409/131 |
| 6,869,549 B2 | * | 3/2005 | Ansell et al. .................. 264/2.3 |
| 6,913,424 B2 | * | 7/2005 | Yoshihiro et al. ............. 407/42 |
| 7,009,774 B2 | * | 3/2006 | Yoshikawa et al. .......... 359/626 |
| 7,060,175 B2 | * | 6/2006 | Morikawa et al. ............. 205/79 |
| 7,140,812 B2 | * | 11/2006 | Bryan et al. ................. 407/119 |
| 7,178,433 B2 | * | 2/2007 | Matsuda et al. .............. 82/1.11 |
| 2003/0034574 A1 | * | 2/2003 | Tohara et al. ................. 264/2.7 |
| 2003/0127759 A1 | * | 7/2003 | Border et al. ................. 264/2.5 |
| 2006/0120816 A1 | * | 6/2006 | Morimoto et al. ........... 409/132 |

FOREIGN PATENT DOCUMENTS

| | | |
|---|---|---|
| JP | 52-45613 | 4/1977 |
| JP | 2-1782   | 1/1990 |
| JP | 3-55421  | 8/1991 |
| JP | 3-59016  | 9/1991 |
| JP | 3-61617  | 9/1991 |

* cited by examiner

*Primary Examiner*—Jeffrey Wollschlager
(74) *Attorney, Agent, or Firm*—Finnegan, Henderson, Farabow, Garrett & Dunner, L.L.P.

(57) ABSTRACT

A method of forming a transferring surface onto a producing die to produce an optical element, wherein the transferring surface transfers an optical surface onto the produced optical element, the method comprising the steps of: cutting a material so as to form the transferring surface with a curvature; wherein the material has a hardness not smaller than Rockwell hardness HRA 80 or Vickers hardness Hv 1000 and the cutting step is conducted with a critical cutting-in depth of 5 µm or less for the material.

12 Claims, 14 Drawing Sheets

FIG. 1 ( a )  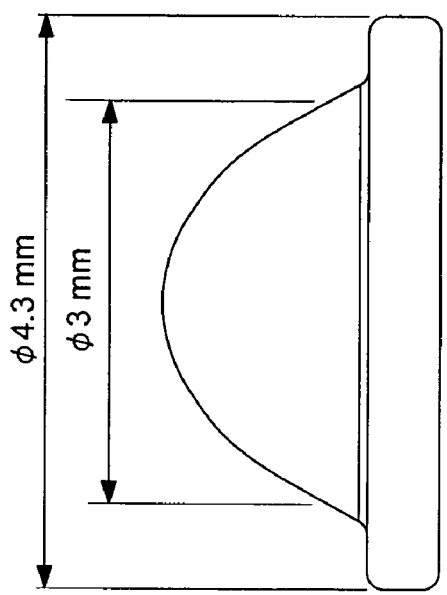
FIG. 1 ( b )  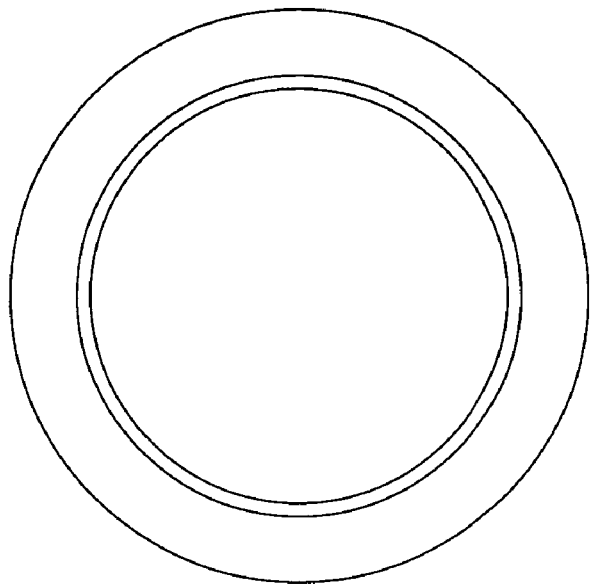

Surface Statistics :
Re : 1.61 nm
Rq : 1.97 nm
Rz : 12.99 nm
Rt : 23.76 nm

Set-up Parameters :
Size : 736 x 480
Sampling : 163.10 nm

Processed Options :

Terms Removed :
Curvature & Tilt

Filtering :
None

Surface Statistics:

Re : 1.99 nm
Rq : 2.46 nm
Rz : 15.43 nm
Rt : 16.86 nm

Set-up Parameters:

Size : 736 × 480
Sampling : 163.10 nm

Processed Options:

Terms Removed:

Curvature & Tilt

Filtering:

None

Bestfit R = -1.2271184 (mm)

Status   R.M.S = 0.0356 ($\mu$m)   P-V = 0.1695 ($\mu$m)

(THE MORE HARDLY WORN, THE SMALLER NUMERAL IS)

OPTICAL AXIS

METHOD OF FORMING A DIE SURFACE TO PRODUCE AN OPTICAL ELEMENT

BACKGROUND OD THE INVENTION

The present invention relates to a processing method of a transfer optical surface to transfer an optical surface onto an optical element, a processing device, and an optical element molding use die, and particularly to a processing method of the transfer optical surface appropriate for a cutting processing of a small optical surface, a processing device, an optical element molding die by which such an optical surface can be formed, and a diamond tool.

In order to mold or produce an optical element by using an optical material such as a glass or plastic, when the optical material which is heated and softened, is injected into the cavity formed by the molding die (hereinafter, also called molding die) for the optical element, with a high pressure, or when it is pressed by a molding die (a pressingly forming die) and cooled and solidified, the transfer optical surface shape or surface roughness owned by the die, is molded and transferred to the optical material, and the optical surface is formed, the optical element can be efficiently produced. Because the molding die having this transfer optical surface is brought into contact with the heated optical material with the high pressure, the conditions to secure the long working life of the molding die, such as a sufficient heat resistance, a low reactivity or wettability so that the optical material is not adhered, and a high and not easily flawed hardness are necessary, and simultaneously, a condition that the processing is easy and the productivity is high, is important to reduce the cost of the molding die production, and as a result, to lower the cost of the optical element, and realize an efficient productivity.

Conventionally, in order to produce the molding die for molding the optical element whose material is glass, material whose heat resistivity is high, such as the ceramic or cemented carbide material is attached to the main shaft of the processing device as shown in FIG. 8, and it is processed into the transfer optical surface shape by the cutting processing by a grinding stone using diamond abrasive grains, and in order to further improve its surface roughness, the grinding is conducted as the after processing. Then, when, on the surface of the processed transfer optical surface, the protective coating is conducted by the material such as carbon whose wettability with the glass is small, boron nitride of the thickness of about 100 nm to 1 μm to prevent the adhesion to the glass, or precious metal, the molding die is produced. Relating to the production method of the transfer optical surface of these molding dies, is generally described in the patent references 1-5. As the ceramic material used for the molding die, the molding die described in Table 1, and it is seen that the hardness is almost not smaller than the Rockwell hardness HRA 90 and is very hard material.

[Patent reference 1]
    Tokkaisho-No. 52-45613
[Patent reference 2]
    Tokkohei No. 2-1782
[Patent reference 3]
    Tokkohei No. 3-55421
[patent reference 4]
    Tokkohei No. 3-59016
[Patent reference 5]
    Tokkohei No. 3-61617
[Not-Patent reference 1]
    "The study of ductile mode cutting processing of the optical glass by single point diamond machining" by Ichiro Ogura and Yuichi Okazaki in the precision engineering society magazine Vol. 66, No. 9, 2000.

TABLE 1

| Name of ceramic material | Fracture toughness value (MN/m$^{3/2}$) | Young's modulus (Gpa) | Critical overbear depth dc (μm) | Hardness (HRA/HV) |
|---|---|---|---|---|
| Alminum nitride (AlN) | 3.0 | 310 | 2.79 | 89/1000 |
| Zirconia (ZrO$_2$) | 10.0 | 210 | 10.8 | 91.2/1250 |
| Silicon nitride (Si$_3$N$_4$) | 7.5 | 310 | 2.75 | 93.5/1850 |
| Silicon carbide (SiC) | 3.2 | 420 | 0.31 | 94/2400 |
| Silicon carbide (CVD-SiC) |  | 490 |  | 97/2800 |
| Alumina (Al$_2$O$_3$) | 4.2 | 402 | 1.03 | 93.6/1900 |
| Boronic carbide (B$_4$C) |  |  |  | 97.5 |
| Chrome carbide (Cr$_3$C$_2$) | 4.0 | 372 | 3.44 | 91/1200 |
| Titanium boride (TiB$_2$) |  | 500 |  | 94 |

Relating to the molding die using the ceramic material, in the case where its point of the problem is further detailed, when the powder of the row material is sintered, because even when it is the normal pressure sintering or the high pressure sintering, the gap between its powder remains also after sintering, and it becomes a residual bore, there is a case where a minute hole is generated on the optical surface when the cutting processing or grind processing is conducted. This minute hole becomes a cause that it makes the useless minute convex portion, that is, a defect generate on its optical surface when the optical element is molded, or the glass material is fused to the molding die. Therefore, normally, the following processing is conducted that the rough shape processing of the optical surface is conducted by the cutting processing or in the case of conductive ceramic, by the discharge processing described in Tokugan No. 2002-017122, Tokugan No. 2001-359838, on the sintered mold material, and the CVD (Chemical Vapor Deposition) coating of the ceramic material whose linear expansion coefficient is about the same, is conducted from the film thickness 10 μm to 5 mm, and minute ceramic layer is provided, and the cutting processing or grind processing is conducted on this ceramic layer, and the optical surface shape such as an aspheric surface is accurately produced. That is, in the die for optical element molding by the mold material of the ceramic, the main body is the powder sinter material, however, it is common that the transfer optical surface portion is made a minute ceramic by the CVD coating, and in order to generate the transfer optical surface shape on such a very minute and high hardness ceramic material at the shape accuracy 50 nm or not higher than that, the cutting processing is conducted by the grind stone using the diamond abrasive grain, and further, the grind processing is conducted as the after processing for the improvement of its processing surface roughness.

Then, in order to enhance the mold releasing property from the glass, on its optical surface, the film of DLC (Diamond Like Carbon) or boron nitride which has a poor wettability to the glass is formed in the thickness not larger than 1 μm by the ion plating or spattering, and it is used for the molding.

As an index showing the processing difficulty of the ceramic material, the value in which the critical pressing depth dc of the transition area under which the brittle fracture is caused, is calculated from the ductility condition when the diamond pressing piece is pressed in the ceramic material, shown in Table 1. This is the value calculated by the following expression (1), and the limitation value at which the material is brittle-fractured when the pressing piece is pressed-in more than this value.

[Arith. 1]

$$dc = \frac{E}{Hv}\left(\frac{K}{Hv}\right)^2 \quad (1)$$

Where, dc: critical overbear depth (μm), E: Young modulus (GPa), Hv: Vickers harness (GPa), K: fracture toughness value (MPam$^{1/2}$)

When actually a grind stone or a cutting edge of the cutting tool is cut in the material, it is said that when it is not a fraction of the critical overbear amount, because the processing is advanced by the brittle fracture, the optical mirror surface can not be attained. That is, even in the case of zirconia whose critical overbear amount is maximum, when the depth of cut of the cutting edge of μ-order is not stably realized, the mirror surface can not be generated, and in the above patent references, in the case of silicon carbide which is widely cited as the material of the die for the optical element molding, it can be seen that the transfer optical surface can not be generated when the depth of cut is not at least about 100 nm. As described above, when the transfer optical surface is generated and processed on these ceramic material, it can be said that the processing is very low efficient and the processing of the high difficulty. Because of such a reason, by the cutting tool such as the diamond, by the minute depth of cut of the only one cutting edge, it can be said that a fact that the high accurate transfer optical surface is generated and processed on these ceramic material, is inefficient and the tool abrasion is conspicuous, and it can be said that conventionally, it is unthinkable. Further, such instances are not believed to exist. Accordingly, conventionally, it is general that, by using the diamond grind stone, by the cutting processing by which the processing efficiency can be maintained high by cutting edges of a plurality of abrasive grains, the transfer optical surface shape is generated, and after that, it is ordinary that a scratch generated by the cutting processing or a chatter mark is removed by the grind processing, and a smooth optical surface is generated.

Further, when the optical element molding die is generated by the cemented carbide material, in the general use grade of the cemented carbide material which can be comparatively easily obtained, there is a material in which cobalt of 10 and several mol % is mixed in grains of tungsten carbide (WC) as the binding material and sintered, however, because cobalt is low in the thermal resistance, and when the temperature is increased high, there is a characteristic that it is easily oxidized, it is not appropriate also for the material of the optical element molding use die by which a very common glass for molding whose glass transition point is from 500 C to 600 C, is molded. Further, when the content of cobalt is large, the specific gravity or hardness of the cemented carbide material is decreased, however, because also the organization structure after the sintering, is thin, when the transfer optical surface is generated by the cutting processing or grind processing, the surface roughness can not be improved. Accordingly, as the material for forming the transfer optical surface, it can be said that a case where the content of cobalt which is the binding material, is small, is better. Further, when the particle diameter of tungsten carbide (WC) is decreased, because the organization structure after the sintering, is fine, the minute hole (residual bore) when the transfer optical surface is generated, is also decreased, and the surface roughness is improved, however, on the contrary, there is a problem that, because the hardness is increased and the value of fracture toughness is lowered, the brittle fracture is easily caused, and the processing difficulty is increased.

Further, when it is high temperature-sintered by pressing isotropically by argon or nitrogen gas by the HIP processing (hot hydrostatic press)at the time of sintering, because the distance between powders is uniformly compact at the sintering and the density is increased, the residual bores are reduced, and the surface roughness in the transfer optical surface is improved, however, because the hardness is increased corresponding to that, the processing difficulty is further increased. These characteristics of the cemented carbide material are collected in Table 2.

TABLE 2

| WC particle diameter (μm) | An amount of cobalt (mol %) | Sintering method | Specific gravity | Fracture toughness value (MN/m$^{3/2}$) | Young modulus (GPa) | Critical compress depth dc (μm) | Hardness (HRA/HV) |
|---|---|---|---|---|---|---|---|
| 10 | 14 | *1 | 13.0 | | | | 81.5 |
| 10 | 8 | *1 | 14.3 | 12.6 | 540 | 56.4 | 88/1150 |
| 1 | 5 | HIP | 15.0 | | | | 92 |
| 0.5 | none | HIP | 14.7 | 6.5 | 600 | 1.83 | 95/2400 |

*1: Hot press (single shaft press)

As described above, when the composition, particle diameter, or recipe which are appropriate as the transfer optical surface material, are selected so that they are appropriate for the optical element molding use die, the hardness of the cemented carbide material for the transfer optical surface is increased on and on, and finally, it becomes not smaller than Rockwell hardness HRA 90. When trade names of the cemented carbide material actually put on the market are viewed, in the general use cemented carbide material C95 (product name) by Fuji dies (Co.) in which cobalt content is 10 and several %, Rockwell hardness is about HRA 81.5, however, in the cobalt-less cemented carbide material RCC-FN (product name) by Nippon tungsten (Co.) which is particularly processed for the purpose of use of the optical element molding use die, the Rockwell hardness reaches HRA 95 by the increase of fineness and HIP processing, and increase of cobalt-free. Relating to these cemented carbide material, when the critical compression depth which is transited from the ductility area to the brittleness area when the diamond pressing piece is compressed, is calculated, in the same manner as the case of ceramic material, from the fracture toughness value, Young modulus, or hardness, as shown in Table 2, in the general use cemented carbide material in which the cobalt content is slightly decreased, it is 56.4 μm, in contrast to that, in the cemented carbide material for the purpose of use of the optical element molding use die, it is 1.83 μm, and it can be seen that it is decreased to about 1/30. When the cutting depth of the cutting edge at the grinding processing or cutting processing is not made to a fraction of this compression amount, because it is said that the material is brittle fractured, and the optical mirror surface is not formed, and also in the case where the transfer optical surface is generated by the cemented carbide material, it can be understood that, when the material is appropriately selected, in the same manner as the case of ceramic material, it is necessary that, by a very minute cutting amount of 1 μm or less than that, the processing is conducted at a low efficiency.

As described above, because the optical element molding use die produced by the appropriately selected cemented carbide material, is very hard and easily brittle fractured, the processing is difficult, and in the optical element molding use die by these materials having the transfer optical surface shape such as the aspheric surface having actually the curvature, there is no example that the transfer optical surface is accurately generated and processed by the cutting processing by a single cutting edge, and no one has such an idea. Accordingly, conventionally, it is normal that, by using the diamond grind stone, the transfer optical surface generation by the grinding processing by the cutting edge of many abrasive grains, by which the processing efficiency can be maintained high, is generally conducted, and after that, a scratch or chatter mark by the grinding processing is removed by the polishing processing, and a smooth optical surface is generated. Then, on the transfer optical surface, in order to enhance the mold releasing property from the glass, the film of platinum and the alloy of iridium which are poor in the wetness with the glass, is formed into the thickness not larger than 1 μm, and it is used for the molding of glass optical element.

On the one hand, in the die for molding of plastic optical element, the steel material or stainless material refined as the base material is used, and the transfer optical surface shape is cutting processed in the accuracy of about 10 μm by using the general purpose lathe, and is made a blank type. Further, on the transfer optical surface, the electroless nickel plating in which the diamond cutting is possible, is adhered in the thickness of about 100 μm, and by using the hyper precision lathe as shown in FIG. 6, and further, by using the diamond cutting tool as shown in FIG. 7, the mirror surface cutting is conducted, and the transfer optical surface is generated and processed.

However, also in the die for molding of plastic optical element, in the case where its number of production is very large, it reduces the trouble of the die exchange or the stop time of molding that the life of the die is prolonged as long as possible, and becomes important for realizing the good efficient production. Conventionally, the die material such as the above-described electroless nickel plating can easily conduct the diamond cutting, however, on the other side of it, as the hardness, in the Vickers hardness, the upper limit is to about Hv 550, and even when the hardness is increased when the heat processing is conducted and it is crystallized, the upper limit is to about Hv 650 in Vickers hardness. Further, in the molding of plastic optical element, the mold releasing property of resin material and its die material is comparatively good, however, because the working oil is adhered to the transfer optical surface or the resin material is rarely fused, the operation to remove them is necessary, and there are many cases where the die has minute flaws resulting from the wipe-out operation.

Further, in order to take out the molded optical element, in the case where the die parts having the transfer optical surface have the sliding portion by which its transfer optical surface is protruded, the weariness is generated in the die parts by the sliding, and there is a case where the wandering is generated in the engagement portion. Because this engagement portion has the function of the guide by which the situation that the transfer optical surface is accurately set into the molding die set so that the eccentricity is not made in the transfer optical surface, is maintained, the generated wandering causes the slippage or the eccentricity such as tilt or shift of the transfer optical surface, and as the result, there is a possibility that the slippage or eccentricity is transferred onto the optical surface of the molded optical element, and the optical performance of the molded optical element is lowered. As one method for solving this, there is a method in which the conventional steel material, stainless steel material or electroless nickel plating is not used for the die material, but by using the cemented carbide material, there is a case where its transfer optical surface or sliding portion is formed, thereby, the flaw or abrasion can be prevented, and the life of the die can be prolonged. In the case of the die for molding of the plastic optical element for which such a cemented carbide material is used, the generation of its transfer optical surface or sliding portion is, conventionally, in the quite same manner as the case of the die for molding of the glass optical element, the grinding processing by using the diamond grind stone and the polishing processing for improving the processed surface roughness are conducted as after-processing.

Hereupon, in the case of the die for molding of the plastic optical element, because the softening temperature of the plastic material is about 250° C., which is low, and further, it is rare that the resin material is adhered onto the surface of the die of the cemented carbide material, there is the actual condition that to form the film of the mold releasing material on the transfer optical surface is rarely conducted.

From the above description, it can be said that as a large factor by which the processability of the transfer optical surface formed of ceramic material or cemented carbide material is deteriorated, the hardness of these materials are very high and brittle. That is, because the hardness is high, the processing efficiency is very bad, the wear of the tool is conspicuous, and as the result, it is not only difficult that a predetermined processing condition is stably maintained, but, further, because it is brittle material, when the depth of cut of the cutting edge is large, because the processing advances by the fracture, it is necessary that a notching amount is made a very minute depth of cut not larger than 1 μm, and the processing is made advance in the ductility mode. As described above, even when any tool is used, unless the processing is conducted in this ductility mode, the transfer optical surface can not be generated on the material of ceramic or cemented carbide by the machining.

Conventionally, a reason that the generation of the transfer optical surface is conducted by the cutting processing of the ceramic material or cemented carbide material having such a nature, is in the case of cutting processing, even when the diamond which is hardest, is used for the cutting edge, when these materials of high hardness are cutting processed for a long period of time, with an amount of a minute depth of cut by a single cutting edge, because the addendum is quickly worn, and the shape of the addendum is changed, the desired transfer optical surface shape can not accurately be generated. Or, it is due to the thinking that the cutting power is lowered by the quick wearing of the cutting edge and the function as the tool can not be attained. Further, because the cost of the diamond tool is very high, the concerned party easily have the evasion feeling to the cutting processing in which it is thought that the cutting edge is simply worn in this manner and the function is not performed, or in almost references relating to the diamond cutting processing, the content that "the material appropriate for the transfer optical surface generation by the diamond cutting processing is only the soft metal such as copper or aluminum and electroless nickel plating" is written, and due to that a preconception that the diamond cutting processing is not appropriate for the transfer optical surface generation of the hard material such as the cemented carbide or ceramic, is generated, there is an actual situation that it is considered that even the study for putting to practical use is the senselessness.

For example, in the above non-patent reference, the ductility mode processing of silicon carbide (SIC) which is typical ceramic material as the die for the optical element molding of the glass optical element, is described by comparing to BK7 of the optical glass or melting quartz, however, in this conclusion, it is concluded that "BK7 can be easily processed, however, in SIC or melting quartz glass, the crack-free processing is hardly conducted." Even in such a study, conventionally, there is a general thinking that it is not advantageous that the transfer optical surface is generated by the cutting processing of ceramic material or cemented carbide material.

Further, because, in the cutting tool, the elastic deformation is hardly made in the cutting edge at the time of processing, and a notching amount is almost the same as the removal amount, in order to conduct the ductile mode processing in the cutting processing, the high cost hyper precision processing machine by which the notching amount of about 100 nm can be correctly maintained, is necessary. Moreover, in order to fully perform the accuracy of the processing machine, because it accompanies the increase of the cost of the auxiliary facility such as the temperature control of the installation environment or the removal of the floor vibration, it is introduced to the increase of the cost of the die processing, and finally to that of the molded lens.

In contrast to that, in the grinding processing, it is characterized in that: because the diameter of the grinding stone is large and the processing point is on the circumference of the grinding stone comparing to the cutting processing, the processing is conducted by the cutting edge of numerous abrasive grains, and the processing burden of each cutting edge is small and the wearing is small, and even when it is worn, because the grinding stone is rotated, and it always performs as the tool of the true circle, it hardly has a bad influence upon the processing surface shape, and it is hardly processed into the large different shape by which the aberration of the higher order component is generated in the lens performance, and at the time of processing, when the grinding stone is pressed onto the processed material, because it is elastically deformed and yielded, it does not become a compulsory notching, and even when a notch of micron order is given onto the grinding stone, the cutting edge of the abrasive grain practically has a notch not larger than tenth of it, and the ductility mode processing can be comparatively easily realized, and the processed surface close to the optical mirror surface can be obtained.

From such a reason, in order to generate the transfer optical surface on the ceramic material or cemented carbide material, conventionally, not the cutting processing, but the grinding processing and polishing processing as the after processing of that, are conducted in a practical manner.

Certainly, these characteristics play well when particularly the transfer optical surface of the die for the optical element molding is not smaller than 5 mm in the diameter and comparatively large, and in order to generate the transfer optical surface on the material of the cemented carbide or ceramic, the grinding processing is overpoweringly advantageous. However, recently, for example, in an image pick-up lens of a micro camera installed in a carrying telephone, the central radius of curvature of its aspheric surface optical surface is not larger than about 2 mm and the diameter is very small, and also a deep shape in which the maximum normal line angle of the optical surface is not smaller than 65°, is not rare. This means that, in the case where the transfer optical surface is generated by the cutting processing, because the cutting length is reduced by the reduction of the diameter, the wear of the cutting edge of the tool is not so large, and when an appropriate correction processing is jointly used, the shape accuracy of the transfer optical surface can be generated sufficiently high. Further, when the outer diameter is reduced and the radius of curvature of the transfer optical surface is reduced in proportion to it, particularly, in the case where the shape of the processed surface is the concave surface, because it is necessary that, in order to put the grinding stone in a minute concave surface, it is reduced, and the length of the circumference which is a processing section of the grinding stone, is also reduced, and the burden of the cutting edge is increased, and the cutting ratio is started to be rapidly lowered. That is, the difficult points are generated in which, during the grinding processing, the condition of the cutting edge of the abrasive grain is quickly changed and the reproduction of the processing becomes poor, because the diameter of the grinding stone is reduced soon, it is necessary that its correction is frequently conducted, or in order to increase the efficiency of the grinding and increase the peripheral speed of the grinding stone, the high cost high frequency spindle which is rotated at very high speed, is necessary for the shaft of the grinding stone.

Further, in the concave transfer optical surface whose diameter is small and which is very deep, problems are generated in which, because it is necessary that the diameter of the grinding stone is not only reduced, but also the shaft of the grinding stone is made small, and because the bending rigidity of the shaft of the grinding stone is lowered, and the position of the processing point of the die is unstably fluctuated, or the shaft of the grinding stone is brought into an end surface of the processed material, it is necessary that the optical axis which is the grinding stone shaft and the processing rotational shaft of the die, is tilted by about 45° from the orthogonal arrangement. Particularly, in the latter case, because, when the grinding stone is worn during the processing, the processing point of the grinding stone is moved to the tilted direction of the grinding stone shaft, the processing point on the die is moved, and the processing situation is largely changed and unstable. In the case where the grinding stone shaft and the processing rotational shaft of the die are the orthogonal arrangement, even when the grinding stone is worn, because the processing point is not largely moved and only the grinding stone radius is changed, as described above, the processing shape is not so largely influenced. However, as the tendency of the recent optical element, because the optical element of the small diameter and small radius of curvature is increased, there is an actual situation that such a system of the characteristic of the grinding processing can not be used efficiently.

Further, because the radius of curvature of the transfer optical surface is close to the radius of the grinding stone, when the step difference which is the attaching reference of the optical element molded on the outer peripheral portion of the transfer optical surface is going to be provided, there is a case where, because this portion generates the tool interference during the grinding processing, it can not be provided on the die for molding. Therefore, the reference surface when the optical element is attached, does not become always the best position on which the molding optical element is attached, and even to the shape of a part of the other part to be attached, there is a case where the limitation of the design work is given.

When recent problems of these grinding processing are said in one word, it is the following in which, when the processed surface is reduced, the grinding ratio is rapidly deteriorated, and the processing efficiency is lowered, the reproducibility is reduced in the cutting edge or processing condition by the wearing of the grinding stone, and the high accurate transfer optical surface generation becomes difficult.

As the after processing, in the polishing processing by which the surface roughness of the transfer optical surface is improved, when the polishing processing is conducted so much as to eliminate the scratch like surface flaw generated by the grinding processing, the case where the shape of transfer optical surface generated by the grinding processing with much efforts is destroyed, is generated. Accordingly, it can be said that the polishing processing as the after processing of the grinding processing is also, conventionally, the processing method whose reproducibility is insufficient.

SUMMARY OF THE INVENTION

In view of a fact that, by the reduction of the diameter of the recent optical element and the increase of the deep surface degree, the generation of a high accurate transfer optical surface of the die for molding by a ceramic material or cemented carbide material becomes difficult, the object of the present invention is to provide a processing method of the transfer optical surface to generate and realize it by the cutting processing which is not conventionally entirely considered, a processing machine and an optical element molding use die formed thereby, and a diamond tool.

The above-described object can be attained by the following methods.

The processing method of the transfer optical surface according to exemplary embodiment 1, is a method by which, because the hardness of the material constituting the transfer optical surface of the optical element molding use die is not smaller than Rockwell hardness HRA 80 or Hv 1000 in Vickers hardness, and the transfer optical surface is generated by the cutting processing, for example, when the transfer optical surface of the optical element molding use die for molding a small diameter optical element is generated, by avoiding the above described problems which can be generated by the grinding processing using the grinding stone, a transfer optical surface with a high accurate shape can be obtained. That is, on the basis of the conventional experiences or knowledge of the concerned persons, although a fact that the transfer optical surface is generated by cutting the raw material having the very high hardness not lower than Rockwell hardness HRA 80 or Hv 1000 in Vickers hardness, is an action against to the common sense, the document which affirms it does not exist in the extent confirmed by the inventors. The present inventor faces the difficult problem that, by what method the transfer optical surface of the optical element molding use die is accurately formed by using a raw material having very high hardness not lower than Rockwell hardness HRA 80 or Hv 1000 in Vickers hardness, and studies all the processing method without being caught by the conventional common sense, and as the result, it is found that, for example, when the cutting processing is conducted by using the diamond tool, the transfer optical surface can be generated from the raw material having such a high hardness. Furthermore, the present inventor finds that, in the case of the optical element molding use die for molding the small diameter optical element, because the transfer optical surface is also a small diameter, even when the cutting processing is conducted, because the cutting length is short, the wear of the cutting edge per one die can also be suppressed small, and a problem of the cutting edge wear which is one of conventional common sense, can also be avoided.

BRIEF DESCRIPTION OF THE DRAWINGS

FIG. 1($a$) is a side view and FIG. 1($b$) is a front view of an optical element molded by an optical element molding use die produced by the present inventor.

DETAILED DESCRIPTION OF THE PREFERRED EMBODIMENT

Figure 2:
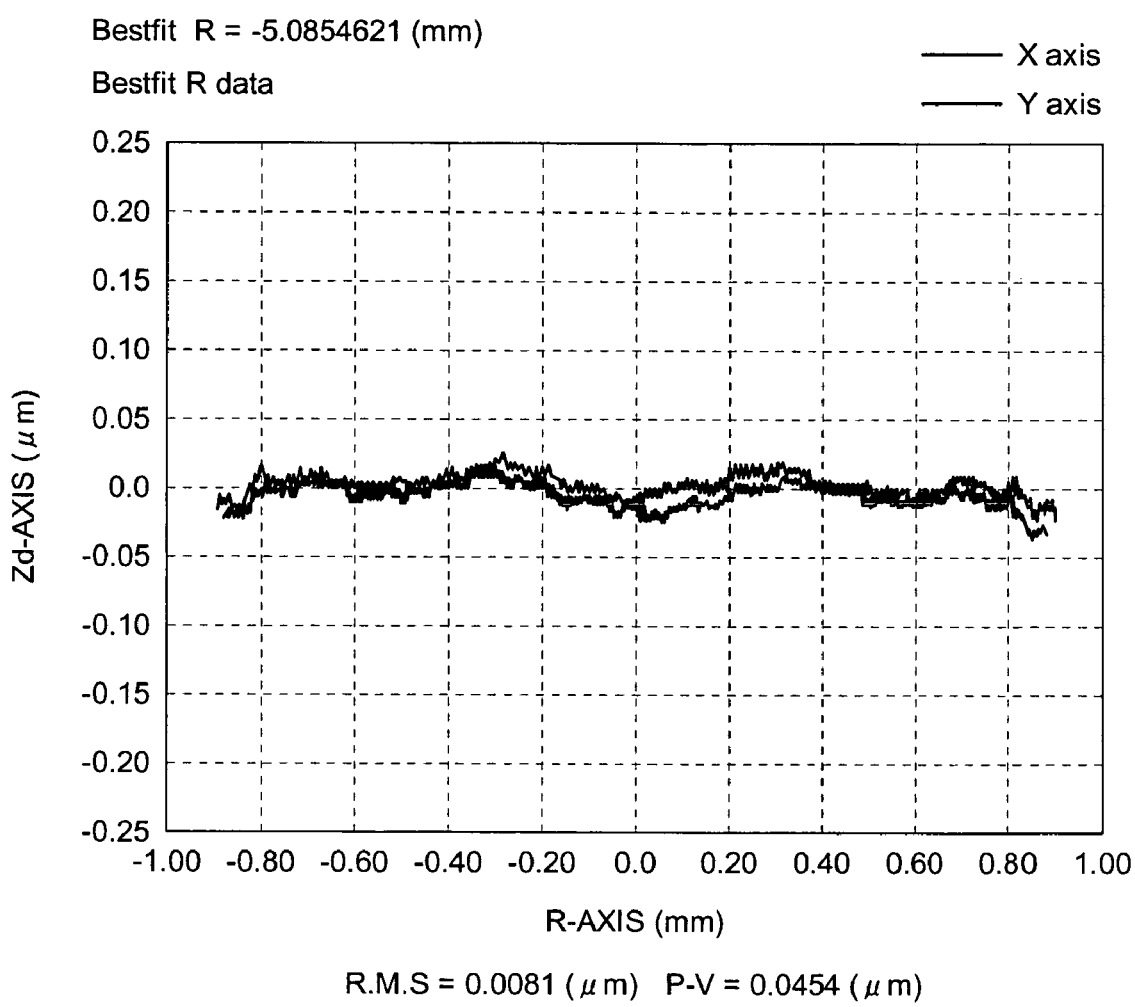
FIG. 2 is a view showing an error of the shape of a transfer optical surface of the optical element molding use die produced by the present inventor.

The preferred embodiment of the present invention will be described below.

In a processing method of a transfer optical surface according to examplary embodiment 2, the hardness of a material constituting the transfer optical surface of an optical element molding use die is not smaller than Rockwell hardness HRA 80 or Hv 1000 in Vickers hardness, and because, while the cutting point of the cutting tool is continuously moved, the transfer optical surface having the curvature is generated by the cutting processing, for example, when the transfer optical surface of the optical element molding use die for molding a small diameter of optical element is generated, by avoiding the above-described problem which can be generated in the grinding processing using a grinding stone, the transfer optical surface with the high accurate shape can be obtained.

In a processing method of a transfer optical surface according to exemplary embodiment 3, the hardness of a material constituting the transfer optical surface of an optical element molding use die is not smaller than Rockwell hardness HRA 80 or Hv 1000 in Vickers hardness, and because, while the cutting point of the cutting tool is fixed at one point, or kept in the angle range within ±15°, the transfer optical surface having the curvature is generated by the cutting processing, for example, when the transfer optical surface of the optical element molding use die for molding a small diameter of optical element is generated, by avoiding the above-described problem which can be generated in the grinding processing using a grinding stone, the transfer optical surface with the high accurate shape can be obtained.

Hereupon, when the cutting processing is conducted on a material with the very high hardness, the wearing of the cutting edge of the cutting tool is generated more or less even when the transfer optical surface to be cut has a small diameter. However, the important point herein is that total cutting length becomes short as the transfer optical surface to be cut becomes a small diameter, and accordingly, because a wear amount of the cutting edge becomes very small, highly accurate cutting can be conducted while the processing cost is being suppressed. Accordingly, as in the present invention, when the cutting point is fixed at one point on the cutting edge of the tool, or when kept in the angle range within ±15°, because the wear of the tool cutting edge used for the cutting processing, is monotonously increased without being unstably advanced by the anisotropy of the cutting edge material, the error of the processed shape of the transfer optical surface generated by this wear of the cutting edge, is gently and monotonously increased according to the processing direction, between the center of the optical surface and the periphery. Because there is no case that such a shape error is locally and rapidly changed, the correction can be very easily conducted when the notching amount of the cutting edge is made to be monotonously increased, for example, at the time of next cutting processing. That is, according to the present invention, while the wear of the tool cutting edge accompanied by the cutting processing is considered, an effect that the transfer optical surface of the optical element molding use die can be high accurately processed, is obtained. Hereupon, "to be kept in the angle range within ±15°" means that, when the cross section including the optical axis of the transfer optical surface and cutting point is taken, and the secondary dimensional coordinate system on the basis of the transfer optical surface is set, a line segment drawn from the rotation center of the tool to the cutting point in such a coordinate system is oscillated at an angle of maximum 30° at the time of processing.

When the diamond tool is used as a cutting tool, it is well known that, by the crystal orientation of the diamond used for the cutting edge, the wearing amount of the tool is largely different. Accordingly, in the case where the cutting processing is conducted on the transfer optical surface of the ceramic material or cemented carbide optical element molding die, when the cutting processing is conducted by using only the crystal orientation in which the wear of the diamond is small, because the wearing amount of the tool is reduced and the tool life is prolonged, a large amount of molding use dies can be processed. For example, by using the hyper precision processing machine shown in FIG. 13 in which the revolving shaft (B shaft) is provided on the tool table of 2-axis hyper precision processing machine, when the <110> orientation of (100) surface in which the wearing amount of the diamond tool is the minimum, or the <110> orientation of (110) surface is attached so that the cutting edge of the diamond tool produced in such a manner that it is a clearance surface or a cutting face of the cutting edge, is positioned, and it is made so that the cutting edge is always positioned at the processing point of the transfer optical surface to be processed (so that cutting point is fixed constant), that is, when the cutting processing is conducted by the simultaneous 3-axis drive so that the crystal orientation in which the wearing amount is reduced is always the normal line direction of the transfer optical surface, because the wear of the tool is small, and the shape of the cutting edge can be kept well over the long cutting length, the number of the time of the tool exchange is reduced, and its trouble and the lowering of the operation rate of the processing machine can be suppressed (see examplary embodiment 3 and examplary embodiment 6, 10-15 which will be described later).

However, in this system, it is necessary that the processing point (cutting point) of the cutting tool is accurately positioned at the center of the revolving axis, and this system has also a defect that the arrangement of the tool setting is complicated and takes a time. In the processing of a very high accurate transfer optical surface, except that an error factor on those arrangements increases, because the processing machine has 3-axis moving portions and they are simultaneously driven, and because all of those machine accuracy are superposed and influence on the processing accuracy, it is not so preferable. Because the error of the processing shape which is generated at that time has many dispersion error components, there is a limit also in the effect of the shape correction processing which will be described later. Accordingly, there are facts that the higher accuracy is required comparing to a case where the cutting processing is conducted by 2-axis processing machine, and that, because it has more movable portions comparing to 2-axis processing machine, it is disadvantageous in the cost, however, the good points and poor points of such 2-axis processing and 3-axis processing are compared and considered, and it is preferable that the optimum cutting processing is conducted. Hereupon, in a case where, while the cutting point of the cutting tool is fixed at one point, or while it is kept in an angle range within ±15°, the transfer optical surface having the curvature is cutting processed, it is needless to say that, not limited to 3-axis processing machine, but by using the hyper precision processing machine with the number of axes of 4-axis or more, it may also be conducted.

In the case where more accurate transfer optical surface is generated, as in examplary embodiments 2 and 5 which will be described later, in the cutting edge rake face of the diamond tool, because a side of a system using a hyper precision lathe of 2-axis motion in which the cutting point is continuously moved is smaller in the dispersion error in the processing shape, and the deviation error by the tool wear is main, when this deviation error is small, the transfer optical surface can be more efficiently generated.

In a processing method of the transfer optical surface according to examplary embodiment 4, because the critical compression depth of the material constituting the transfer optical surface of the optical element molding use die is not larger than 5 μm, and that transfer optical surface is generated by the cutting processing, it can avoid the above-described problem which can be generated in the grinding processing using the grinding stone, for example, when the transfer optical surface of the optical element molding use die for molding a small diameter optical element is generated, and can obtain the transfer optical surface with highly accurate shape.

In a processing method of the transfer optical surface according to examplary embodiment 5, because the critical compression depth of the material constituting the transfer optical surface of the optical element molding use die is not larger than 5 μm, and the transfer optical surface having the curvature is generated by the cutting processing, while the cutting point of the cutting tool is continuously moved, it can avoid the above-described problem which can be generated in the grinding processing using the grinding stone, for example, when the transfer optical surface of the optical element molding use die for molding a small diameter optical element is generated, and can obtain the transfer optical surface with a highly accurate shape.

In a processing method of the transfer optical surface according to examplary embodiment 6, because the critical compression depth of the material constituting the transfer optical surface of the optical element molding use die is not larger than 5 μm, and the transfer optical surface having the curvature is generated by the cutting processing, while the cutting point of the cutting tool is fixed at one point, or while it is kept in the angle range within ±15°, it can avoid the above-described problem which can be generated in the grinding processing using the grinding stone, for example, when the transfer optical surface of the optical element molding use die for molding a small diameter optical element is generated, and can obtain the transfer optical surface with a highly accurate shape.

In a processing method of the transfer optical surface according to examplary embodiment 7, in any one of the inventions described in examplary embodiments 1 to 6, when the shape of the transfer optical surface is an aspheric surface, the aberration characteristic of the molded optical surface of the optical element which is formed from that transfer becomes good.

In a processing method of the transfer optical surface according to examplary embodiment 8, in any one of the inventions described in examplary embodiments 1 to 7, when the effective diameter of the transfer optical surface is not larger than 5 mm, because the grinding processing by a grinding stone becomes difficult, and the cutting length becomes short, a merit of the cutting processing can be easily obtained.

Herein, in the cutting processing, the cutting length when the transfer optical surface whose plane shape is circle, is processed, will be studied. At an instant when the cutting tool is notched from the outer periphery of the rotating transfer optical surface, advances to the center at a constant speed, and reaches the center, because the cutting trace (drawing trace) which is generated when it is separated, is Archimedes' spiral shape, when a condition is defined so that the number of rotation of the main axis is s, and feed speed of the tool is f, the feed amount F per unit angle can be expressed by the following expression.

$$F = f/2\pi s \quad (2)$$

Further, when the radius of the transfer optical surface to be cut is R, and the rotation angle from notching is θ, the position r from the transfer optical surface center of the cutting edge which is cutting, can be expressed by the following expression.

$$r = R - F\theta \quad (3)$$

Herein, when the cutting edge of the cutting tool comes to the transfer optical surface center, r=0, and the maximum value θ max of the rotation angle can be expressed by the following expression.

$$\theta\,max = R/F \quad (4)$$

All cutting length S can be expressed by the following expression.

[Arith. 2]

$$S = \int_0^{\theta max} r\,d\theta = \int_0^{R/F} (R - F\theta)\,d\theta = R^2/2F = s\pi R^2/f \quad (5)$$

According to the above expression (5), when the cutting condition such as the number of rotation s of the main axis or feed speed f is the same, it can be seen that the cutting length S is proportional to the area of the transfer optical surface to be processed. That is, when the diameter of the transfer optical surface to be processed is ½, the cutting length is ¼, and when the diameter of the transfer optical surface to be processed is ⅓, the cutting length is ⅑, and when the diameter of the transfer optical surface to be processed is reduced, it can be understood that the wearing amount of the cutting tool is rapidly decreased. Conventionally, in a camera or an image pick-up lens for a video camera, a lens whose diameter is about 10-15 mm is the mainstream, however, recently, in the image pick-up lens such as a micro camera equipped in a carrying telephone, also a lens whose diameter is about 4 mm, and further, recently, abut 2 mm, is not rare. That is, in the generation processing of the transfer optical surface of the optical element molding use die by which these lenses as optical elements are molded, when it is conducted by the cutting processing, it means that, the wearing amount in the cutting processing is decreased to about ⅙ of the conventional one in the former, and to about 1/50 of the conventional one in the latter. Accordingly, even when it is a die for molding composed of a hard processing material such as a ceramic material or cemented carbide material, in the situation that the tool wear is enough small by the cutting processing, the generation processing of the transfer optical surface in which the reproducibility is good and the accuracy is high, can be realized. Naturally, the present inventor has an eye to this point, and it comes into a mind that, on the molding use die of such a difficult processing material, not by the conventional grinding processing and the polishing processing, but by the cutting processing, the transfer optical surface generation is high accurately conducted.

In a conventional general glass optical element of 10-15 mm diameter, when the transfer optical surface of the die for molding composed of a ceramic material or cemented carbide material is cutting processed, 2 diamond tools are consumed per one surface. When first one is repeatedly used as the rough processing-use even when the cutting edge is worn, one for the finishing processing is always consumed. Accordingly, when it is an optical element of diameter not larger than about 5 mm, 6 transfer optical surfaces corresponding to the normal production of 1 lot can be cutting processed without tool exchange, and comparing to the processing time of the transfer optical surface by the grinding processing of present situation, the advantageousness can be expected.

A processing method of the transfer optical surface according to examplary embodiment 9 is preferable because, in any one of the inventions of examplary embodiments 1 to 9, when the tool cutting edge used for the cutting processing is structured by a diamond, the cutting processing of material not smaller than Rockwell hardness HRA 80 or Hv 1000 in Vickers hardness can be effectively conducted.

A processing method of the transfer optical surface according to examplary embodiment 10 is characterized in that: in any one of the inventions of examplary embodiments 1 to 9, the cutting processing is conducted when the tool cutting edge structured by the diamond and the transfer optical surface of the optical element molding use die are relatively moved along a predetermined direction on the basis of the crystal orientation of the diamond.

When the transfer optical surface is generated by cutting the material having the hardness not smaller than HRA 80 or Hv 1000, by using the tool in which the diamond with very high hardness is used for the cutting edge, because the tool wear is small, and the shape processing error due to it is also decreased, it is preferable. However, because the diamond has the characteristic that the hardness is very largely different depending on the crystal orientation, when the material with the very high hardness is cutting processed by using the crystal orientation with the low hardness as a cutting edge, there is a problem that the cutting edge is soon worn out.

In order to study this phenomenon, the present inventor conducts the following cutting processing. On a fine silicon carbide generated by CVD, by using 2-axis hyper precision lathe, the concave aspheric surface transfer optical surface shape shown in Table 7, and the concave aspheric surface transfer optical surface shape shown in Table 3 are cutting processed. In the transfer optical surface shape shown in Table 7, the maximum normal line angle is mere 1.7° and the curvature is very gentle, and in the transfer optical surface shape shown in Table 3, the normal line angle is 66° and very deep, and the curvature is large. The diamond tool used for both processing is an R bite whose radius of the cutting face is 0.5 mm, and the crystal orientation of the cutting face faced to the forward direction in the cutting direction is (100) surface, and a clearance angle of the front flank faced to the backward direction in the cutting direction is 5°, and the crystal orientation of the front flank is <110> (refer to FIG. 7).

TABLE 7

| optical effective diameter | φ 1.42 mm |
| depth | concave 0.037 mm |
| center R | 2.62289 |
| conical constant k | −0.780185 |
| A4 | −0.191378 |
| A6 | 0.305867 |
| A8 | −0.331043 |
| A10 | 0.290335 |
| A12 | −0.166045 |
| A14 | 0.0421458 |

Herein, in the case of the processing of the transfer optical surface of Table 7, the diamond tool is attached to the processing machine in such a manner that the front flank, that is, <110> orientation is faced to the center of the optical surface, and in the case of the processing of the transfer optical surface of Table 3, it is attached to the processing machine offset by 10°. The cutting processing condition is common, and the rotation speed of the processing optical surface is 1000 rpm, notching amount is 0.1 μm, and tool feed is 0.8 mm/min.

Figure 11:
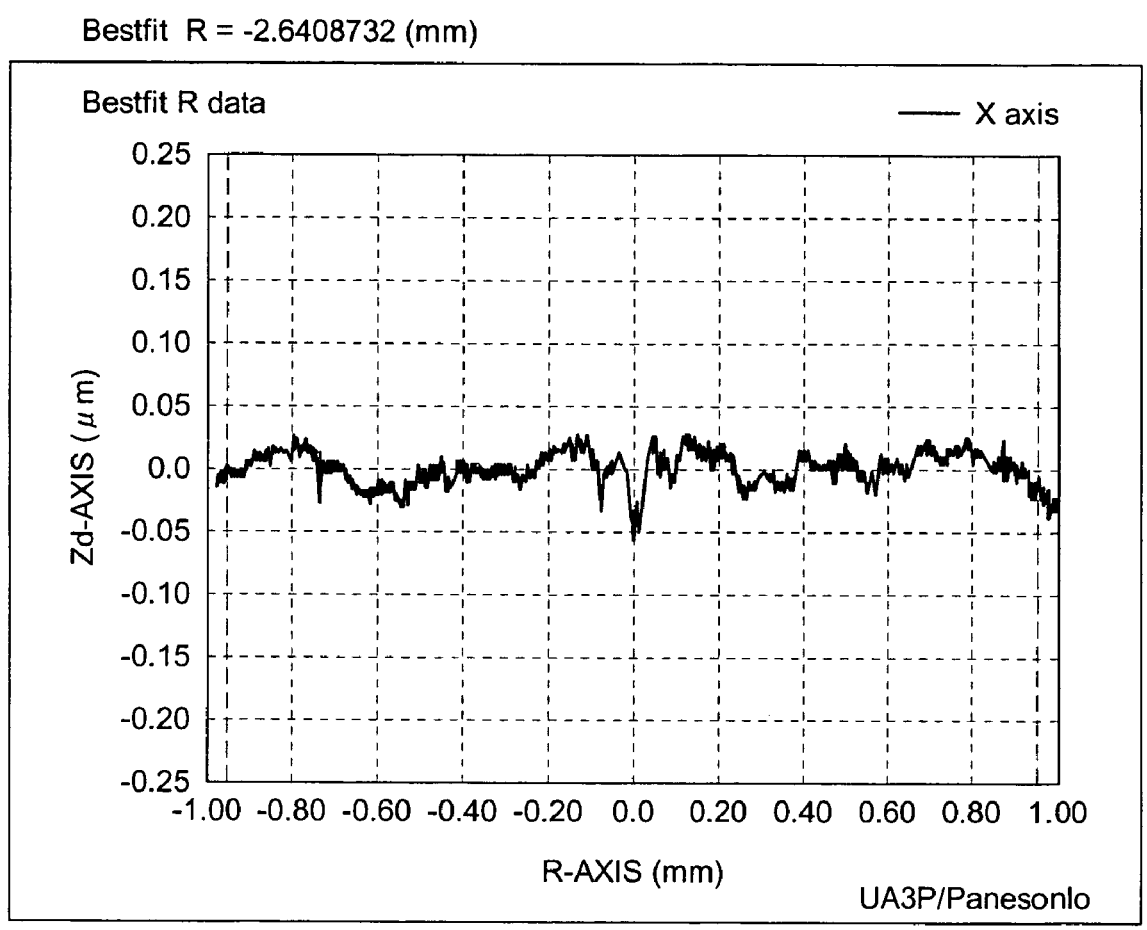
FIG. 11 is a graph in which the roughness of a cutting processed surface is measured.
Figure 12:
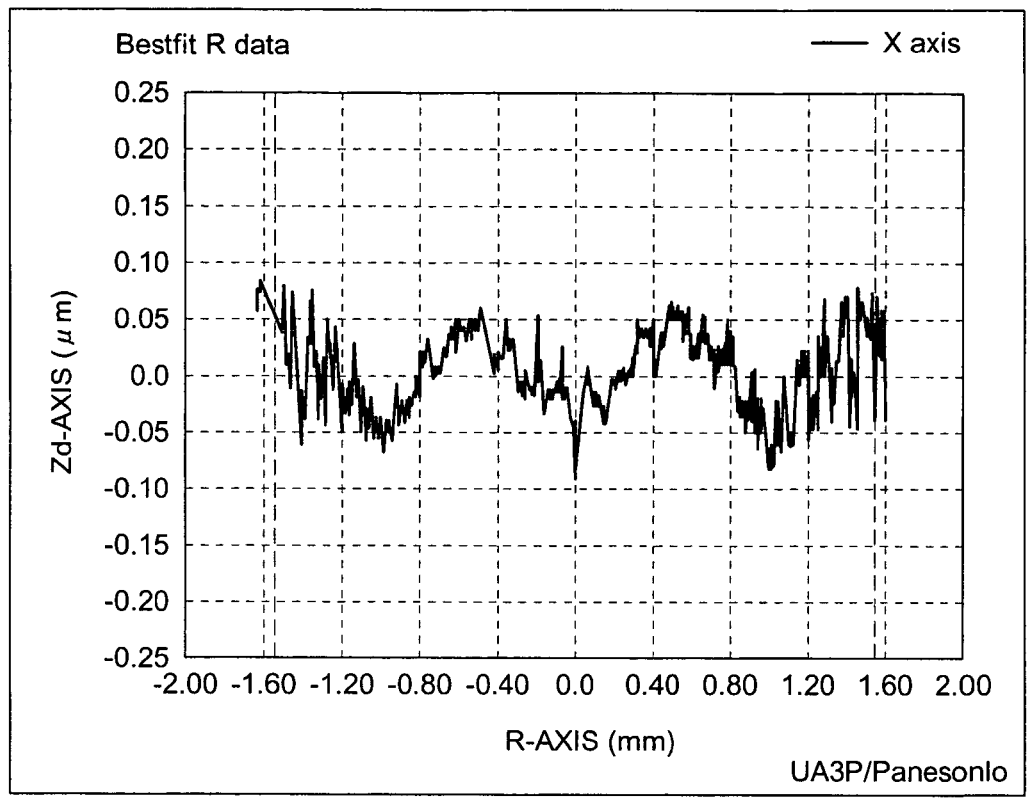
FIG. 12 is a graph in which the roughness of a cutting processed surface is measured.

FIG. 11 is a cutting processing result of the gentle aspheric surface shape shown in Table 7, and expresses the shape error of the sectional shape of the processed optical surface. As can be seen from FIG. 11, by only several times of the ductile mode cutting, the shape accuracy can be expressed high accurately to about 50 nm. On the one hand, the cutting processing result of the deep aspheric surface shape shown in Table 3, is shown in FIG. 12. In this processing, on the basis of the ductile mode cutting processing and the measurement result of the processing shape extending over more than 10 times, the shape correction processing is conducted, however, the processing shape error is not reduced to not larger than 100 nm PV (Peak to Valley), and it becomes surely a waviness shape as shown in FIG. 12, a peak is generated at 0.53 mm position from the center, and further, a valley is generated at 1 mm position from the center. In the correction processing, on the basis of the shape measurement result, a notching amount of a portion whose shape is high, is increased, and the notching amount of a portion whose shape is low, is decreased, however, as described above, this waviness of the shape is not entirely improved.

When this difference of processing accuracy is considered, in the aspheric surface shape in Table 7, other than that the optical effective diameter is small, and the cutting length is shot, because the angle range which is used by the tool cutting edge is merely only 1.7° of the normal line angle, in this range, because the wear resistance of the diamond is almost constant and is not changed largely, it can be judged that the stable ductile mode cutting processing can be realized. In practice, in the correction processing, because, by an amount in which the notching amount is increased, the cutting removal amount corresponding to that, is increased, the processing shape error can be easily reduced. On the one hand, in the aspheric surface shape of Table 3, because the tool cutting edge is used in the very large angle range of the normal line angle of 66°, the crystal orientation whose wear resistance is conspicuously different, is included in the range, and it can be judged that the difference of the wear resistance is transferred as the shape error as it is. That is, it can be judged that, because the wear resistance of the cutting edge used for cutting the optical surface at the 0.53 mm position from the center, is remarkably low, the wear of the cutting edge is quickly advanced, and the shape is retreated, and the circular arc shape of the cutting edge is destroyed. Further, for a risen portion of the processing surface of this portion, it is found that, even when the tool is controlled so that the notching amount of the cutting edge is increased, and the shape correction processing is conducted, because, by an amount in which the notching amount is increased, the cutting load born on the cutting edge is increased, and the cutting edge is more largely worn than the cutting edge when another position is processed by it, and retreated, finally, it remains as the same risen amount, even when the correction processing is conducted any number of times, this waviness can not be removed. That is, when, on the material having very high hardness such as silicon carbide, a deep optical surface is generated by cutting processing by using a 2-axis precision lathe, even when how high the motion accuracy of the processing machine is, because the wear resistance of the cutting edge is largely different depending on the crystal orientation of the diamond tool, the processing shape error can not be reduced to only a certain extent (in this case, 100 PV), in other words, there is a case where the high accurate optical surface can not be generated.

In this connection, in the optical surface shape in FIG. 12, the angle range in which the wear of the cutting edge at the 0.53 mm position from the center is considerable, is the direction of about 13.2° to the <110> orientation of the front flank, and the angle range of 1 mm position from the center which is thought that the wear resistance is comparatively high is about 35.5°, and 56° in the outermost periphery. Further, from a processing example in FIG. 11, when the angle range used in the cutting processing is limited to a narrow range, the processing shape error by the advance of a partial wear of tool is not generated, and further, it can be understood in combination with the above description that, because it becomes a monotonous wear, the correction processing can be easily conducted. That is, when the crystal orientation in which the wear resistance of the diamond is high, is selected and the cutting edge is provided, and by the cutting point in the very narrow angle range in the vicinity of it or one point of that, the diamond cutting is conducted by the axis motion not smaller than 3 axes, the tool wearing can be suppressed. The important point at this time is a point that, in the precision processing machine of not smaller than 3-axis, because, by an amount in which the axial structure is more complicated comparing to 2-axis as described above, the rigidity or motion accuracy is easily lowered, the processing machine by which the relative position of the optical surface and the tool cutting edge can be controlled sufficiently high to a desired optical surface shape accuracy, is used. For the range of the crystal orientation to be selected of the diamond, it can be considered that, when considered that the crystal orientation error when an ore is attached to the tool shank, is about ±5°, from the angle dependency of the crystal orientation of the result of Table 3, when the desired crystal orientation exists in the range of about 15°, its characteristic of wear resistance can be expected.

Hereupon, which crystal orientation may be selected, will be considered below. Because the crystal structure of the diamond is a regular octahedron, and symmetry is good, in the crystal surface having the different characteristic, basically, there are only 3 kinds such as (111) surface which is a slant face, (110) surface which is generated in a ridgeline, and (100) surface generated at an apex. The weariness depending on the polishing direction in its each surface is empirically well known, for example, as shown by an arrow in FIG. 14, it is smaller in the dotted line direction, and larger in the real line direction. Further, in the diamond tool for the transfer optical surface cutting processing used in the present invention, ordinarily, a rake angle (an angle formed between the surface perpendicular to the cut surface and the cutting face) is about 0°, and a clearance angle (an angle formed between the cut surface and the flank) is about 5°, considering about the easiness of chipping. Accordingly, a fact that the cutting face is 0°, is that the direction in which the cut surface is fed to the cutting edge (cutting direction) forms 90° to the cutting face, further, because an angle in which the clearance face forms to the cutting face is 85°, which is near about 90°, this shape of the cutting edge is very good convenient for determining the orientation of the cutting edge from the crystal of the diamond. That is, by 2 factors in which, as the cutting face, which of above-described 3 kinds of surfaces is selected, and which surface perpendicular to the selected surface is positioned in the flank, it can be specified that, in which manner the crystal orientation is positioned for the tool cutting edge.

A diamond tool whose tool wearing is small can be obtained when the following is conducted. In a ordinary R bite whose cutting face is a circular arc shape, it is preferable when the (100) surface whose polishing is comparatively easy is positioned as the cutting face. As can be seen from FIG. 14, when the (100) surface is positioned as the cutting face, the crystal surfaces forming 90° which can be positioned in the front flank is two of the (100) surface and the (110) surface, and depending on which of them is selected, the characteristic such as the easiness of the polishing of the cutting edge or the easiness of chipping is generally determined. Because, normally, the profile accuracy of the cutting face is regarded as important, in a method in which the wearing of the cutting edge does not comparatively depend on the crystal orientation, it is easy to process the roundness of the profile by polishing, and the wear of the cutting edge when it is used is uniform, and the roundness is easily maintained, in such an orientation, the (110) surface is positioned on the flank. This is expressed as the <110> orientation by the normal line vector of the surface. Accordingly, in the ordinary R bite for the optical surface processing, because the profile accuracy of the cutting face, that is, the easiness of the processing is regarded as important, "the cutting face is (100) surface, and the diamond ore is arranged so that its front flank is <110> orientation". However, in this case, as shown by a real line arrow, the degree of the wear of the flank becomes 10, and the tool wearing becomes is frequent. In the case where the material having comparatively low hardness is cutting processed, also in such a tool, particularly, there is no problem, however, in the case where the hardness is high as in the case of the material whose Rockwell hardness HRA is not smaller than 80, or whose Vickers hardness is not smaller than Hv 1000, the serious problem as described above, is generated.

Figure 14:
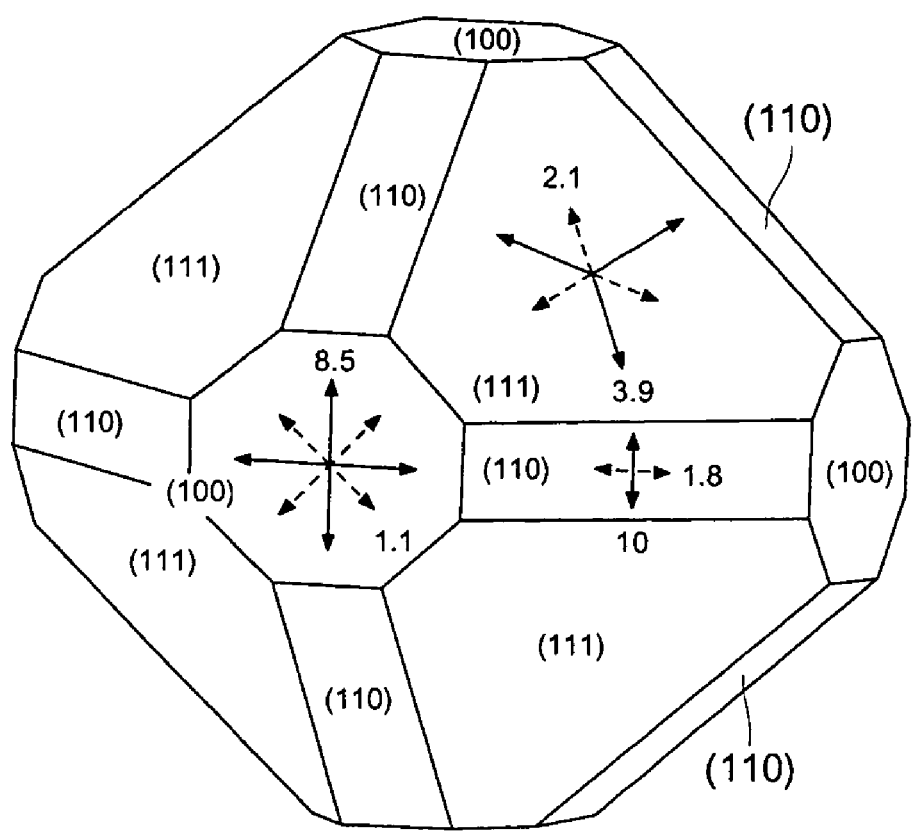
FIG. 14 is a typical view of a diamond crystal.

On the one hand, as shown by the dotted line arrow in FIG. 14, it can be seen that the degree of the wear in the left and right directions of (110) surface and in the slant direction of (100) surface is specifically small. From this, the present inventor finds that, when the crystal orientation is positioned so that respective directions are cutting directions (direction in which the cutting surface is fed to the tool cutting edge), the cutting processing in which the wear resistance is high and the generation of the optical surface shape is easy, can be realized. Specifically, the selection method of the surface will be described below.

Initially, a case where the left and right directions of the (110) surface (<110> orientation) is the cutting direction is only a case of the (110) surface which the cutting face forms the right angle to this surface. That is, it can be found that it is good when, in the crystal orientation of the diamond tool in which the wear resistance is high, and which is optimum for the present invention, the cutting face is the (110) surface, and the relative movement direction of the transfer optical surface and the front flank is the <110> orientation. Next, when a case where the slant direction of the (100) surface (<110> orientation) is made the cutting direction, is considered, it can be found that, because the surface perpendicular to this is the (110) surface, even when the cutting face is the (110) surface and the relative movement direction of the transfer optical surface and the front flank is the <100> orientation, the cutting edge whose wear resistance is high can be generated.

As described above, because the characteristic depending on the crystal orientation can be expected when the desired crystal orientation exists generally in about ±15°, this can be expressed such that it has a diamond cutting edge in which the rake angle to the cutting direction of the cutting face of the cutting edge of the diamond tool is within 0°±15°, and the cutting face is within the (110) surface ±15°.

Further, when it has an eye to the (111) surface, as shown in FIG. 14, comparing to the other crystal surfaces, it can be seen that the wearing property does not depend on the orientation and low, and when this (111) surface is positioned on the front flank and made to coincide with the cutting direction, the cutting edge whose wear resistance is high even when the orientation is any direction, can be produced.

By using the diamond tool in which such a crystal orientation is selected, when the cutting processing is conducted in the range in which the cutting point of the tool cutting edge is one or not larger than ±15°, even when it is the material whose hardness is high, the optical surface can be high accurately generated.

A processing method of the transfer optical surface according to examplary embodiment 11 is characterized in that: in the invention according to examplary embodiment 10, the tool cutting edge structured by the diamond has the cutting face faced to the forward direction in the cutting direction at the time of processing, to the transfer optical surface of the optical element molding use die to be cut, and the flank faced to the backward direction in the cutting direction, and the cutting face is made the (110) surface of the diamond, and the transfer optical surface of the optical element molding use die is cutting processed while it is relatively moved to the cutting face along the (110) surface of the diamond existing in the direction in which it crosses with the cutting face, therefore, the transfer optical surface in which the tool wear is small and the shape correction is easy, can be generated. Hereupon, "the cutting face is made the (110) surface of the diamond" does not means that the cutting face and the (110) surface are not always made parallel to each other, but, for example, both may be inclined in the range of ±15°.

A processing method of the transfer optical surface according to examplary embodiment 12 is characterized in that: in the invention according to examplary embodiment 10, the tool cutting edge structured by the diamond has the cutting face faced to the forward direction in the cutting direction at the time of the processing, and the flank faced to the backward direction in the cutting direction, to the transfer optical surface of the optical element molding use die to be cut, and the cutting face is made the (110) surface of the diamond, and the cutting processing is conducted while the transfer optical surface of the optical element molding use die is made to relatively move to the cutting face, in the angle range of ±15° to the (110) surface of the diamond existing in the direction which crosses with the cutting face, and therefore, the transfer optical surface in which the tool wear is small and the shape correction is easy can be produced.

A processing method of the transfer optical surface according to examplary embodiment 13 is characterized in that: in the invention according to examplary embodiment 10, the tool cutting edge structured by the diamond has the cutting face faced to the forward direction in the cutting direction at the time of the processing, and the flank faced to the backward direction in the cutting direction, to the transfer optical surface of the optical element molding use die to be cut, and the cutting face is made the (110) surface of the diamond, and the cutting processing is conducted while the transfer optical surface of the optical element molding use die is made to relatively move to the cutting face, along the (100) surface of the diamond existing in the direction which crosses with the cutting face, and therefore, the transfer optical surface in which the tool wear is small and the shape correction is easy can be produced.

A processing method of the transfer optical surface according to examplary embodiment 14 is characterized in that: in the invention according to examplary embodiment 10, the tool cutting edge structured by the diamond has the cutting face faced to the forward direction in the cutting direction at the time of the processing, and the flank faced to the backward direction in the cutting direction, to the transfer optical surface of the optical element molding use die to be cut, and the cutting face is made the (110) surface of the diamond, and the cutting processing is conducted while the transfer optical surface of the optical element molding use die is made to relatively move to the cutting face, in the angle range of ±15° to the (100) surface of the diamond existing in the direction which crosses with the cutting face, and therefore, the transfer optical surface in which the tool wear is small and the shape correction is easy can be produced.

A processing method of the transfer optical surface according to examplary embodiment 15 is characterized in that: in the invention according to examplary embodiment 10, the tool cutting edge structured by the diamond has the cutting face faced to the forward direction in the cutting direction at the time of the processing, and the flank faced to the backward direction in the cutting direction, to the transfer optical surface of the optical element molding use die to be cut, and the cutting processing is conducted when the transfer optical surface of the optical element molding use die is made to relatively move to the cutting face, along the (111) surface of the diamond, and therefore, the transfer optical surface in which the tool wear is small and the shape correction is easy can be produced.

A processing method of the transfer optical surface according to examplary embodiment 16 is characterized in that: in the invention according to examplary embodiment 10, the tool cutting edge structured by the diamond has the cutting face faced to the forward direction in the cutting direction at the time of the processing, and the flank faced to the backward direction in the cutting direction, to the transfer optical surface of the optical element molding use die to be cut, and the cutting processing is conducted when the transfer optical surface of the optical element molding use die is relatively moved to the cutting face, in the angle range of ±15° to the (111) surface of the diamond, and therefore, the transfer optical surface in which the tool wear is small and the shape correction is easy can be produced.

A processing method of the transfer optical surface written in an item according to examplary embodiment 17 is characterized in that: in the invention described in any one of examplary embodiments 10-16, a rake angle of the cutting face of the tool cutting edge is within 0±15°, and therefore, the transfer optical surface in which the tool wear is small and the shape correction is easy can be produced.

A processing method of the transfer optical surface according to examplary embodiment 18 is characterized in that: in the invention described in any one of examplary embodiments 10-17, the cutting processing is conducted while the tool cutting edge structured by the diamond is rotated in the surface including the optical axis of the transfer optical surface of the optical element molding use die to be cut, and the cutting point.

A processing method of the transfer optical surface according to examplary embodiment 19 is characterized in that: in the invention described in any one of examplary embodiments 10-18, a normal line angle of the transfer optical surface of the optical element molding use die which is the cutting processed by using the tool cutting edge structured by the diamond is not smaller than 30°.

A processing method of the transfer optical surface according to examplary embodiment 19 is, in the invention described in any one of exemplary embodiments 10-19, when the hyper precision processing machine in which the control resolving power of a shaft holding the cutting tool of the processing machine used for the cutting processing or the transfer optical surface, is not larger than 100 nm, is used, highly accurate transfer optical surface can be produced.

Figure 6:
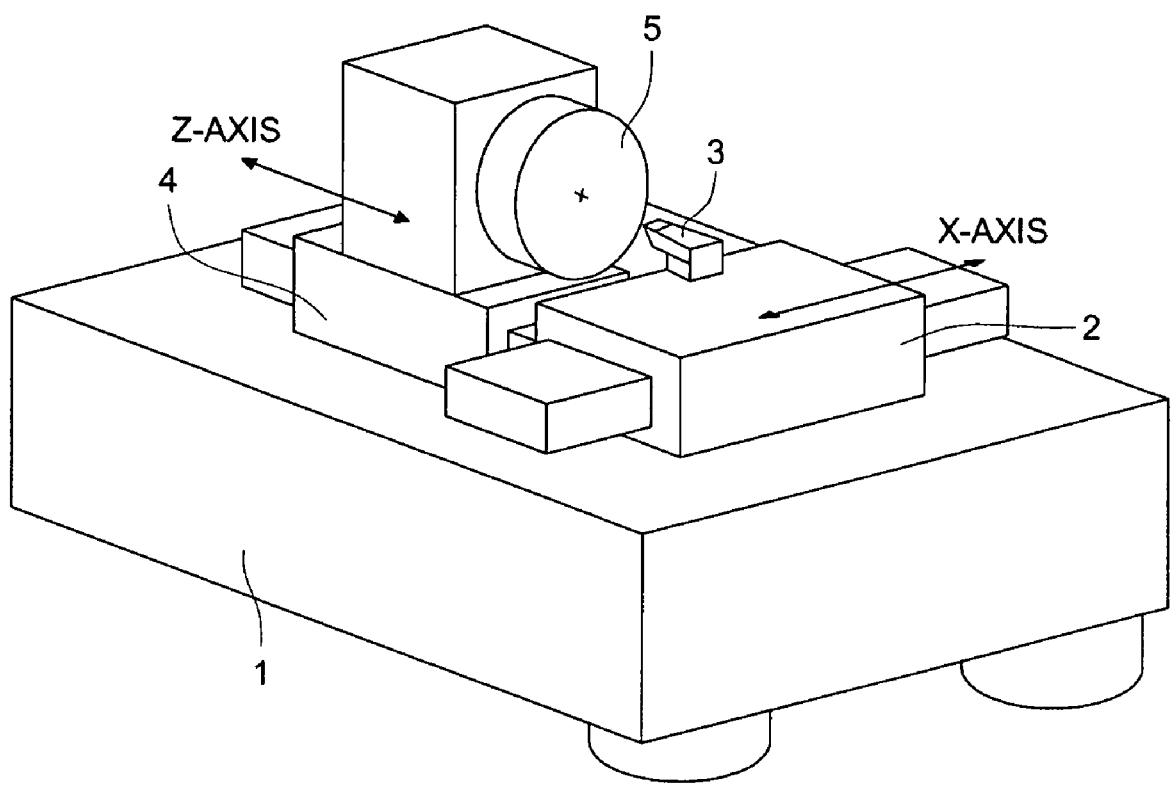
FIG. 6 is a perspective view of a hyper precision processing machine by which a processing method of the transfer optical surface according to the embodiment of the present invention can be conducted.

The hyper precision processing machine shown in FIG. 6, is a 2-axis front lathe whose axis resolving power is not larger than 100 nm, and a main axis is very smoothly rotated by an air spindle, and it holds the optical element molding use die which is a work piece, on its head surface, and can rotate at about 10 nm in NRRO (Non Repeatable Reading Out: non-repeatable error). On the tool bed, the diamond tool is arranged, and machining is conducted when the cutting edge is notched by the movement of 2 axes. The different point from the ordinary processing machine is a point that the motion accuracy of the axis is very high so that the cutting of the ductile mode by the sub-micron minute notching is stably conducted. Accordingly, herein, the hyper precision processing machine is a mode of the front lathe, however, the scope of the present invention is not limited to the front lathe, but all of the processing machine whose control resolving power is not larger than 100 nm, are included.

A processing method of the transfer optical surface according to examplary embodiment 21 is, in the invention described in an examplary embodiment 20, it is preferable when the hyper precision processing machine has a movable portion not smaller than 3 axes (for example, 3-axis processing machine).

A processing method of the transfer optical surface according to examplary embodiment 22 is, in the invention described in any one of examplary embodiments 1-21, when the cutting processing is conducted again while the cutting tool used for the cutting processing or the transfer optical surface is made to relatively move corresponding to the obtained difference when the shape of the transfer optical surface cutting produced by the cutting processing is measured, and the difference between the measured shape and ideal shape is obtained, highly accurate transfer optical surface can be produced.

When ceramic which is a difficult processing material in which the hardness is high and the critical indentation depth is shallow, or cemented carbide material is cutting processed in the ductile mode, because, when it is a small diameter transfer optical surface, the cutting length is short, it is described that the processing can be completed while the wear of the cutting edge is small. However, in the case of the transfer optical surface processing of the molding use die for molding a highly accurate optical element, the processing shape error generated when the shape of the tool cutting edge is changed by the wear, can not be disregarded.

In this case, when the cutting processed transfer optical surface shape is measured by an appropriate shape measuring device, and an error between the sectional shape of the transfer optical surface and the ideal shape is found, and about the same amount is corrected by adjusting the notching amount of the tool by the next cutting processing and the shape is produced, highly accurate transfer optical surface can be obtained. This is from a reason that, in the case of the cutting processing, because the notching amount of the cutting edge is almost equal to the removal depth, when an amount of the shape error is superposed on the notching amount, the correction processing can be realized with good reproducibility. In order to realize such a shape correction processing, when a shape measuring device and the shape error clearly seen thereby, are taken into a personal computer as the data of sequence of points, and the shape correction amount is found by conducting the calculation which will be later, and it is superposed on a part program for driving the hyper precision processing machine, and a new part program is outputted from a personal computer, it can be comparatively simply realized. When the shape correction processing is not conducted by the axial motion of the hyper precision processing machine, but by another actuator, the tool or the molding use die which is a work piece is driven, it is not necessary to make again the part program, and it may be allowable when there is a mechanism to control the notching amount of the tool by operating the actuator while being in timed relationship with the original axial movement.

Herein, the important points are a point that the shape correction amount superposed on this original notching amount is made not to increase, and a point that there is not a rapid change in the shape correction amount and it is gently continued. In the case of the former, it is from a reason that, in the transfer optical surface generated by the ductile mode cutting with much effort, the notching amount of the cutting edge goes over the critical compression depth, and generates the brittle fracture, and not only the mirror surface property of the processed transfer optical surface is lost, but also the cutting edge of the tool generates the chipping at the time, and the optical mirror surface can not be produced. In order to prevent this, a limiter value is provided so that, even when the shape correction amount is superposed, the cutting edge does not go over the critical compression depth, and while discriminating the relationship of large and small one, the notching amount is adjusted. Further, in the case of the latter, when the cutting edge of the tool is moved as it taps the transfer optical surface, by its vibration, because there is a case where the cutting edge of the tool is chipped, or the transfer optical surface is brittle fractured, the shape error or the shape correction amount is approximated by the polynomial and made as a function and makes continuous, and even when, what part in the diameter direction of the transfer optical surface its differential value is, it can be avoided when it is saturated there so that it does not also go over the limiter value. Further, when it is difficult to make as the function, and it is calculated as the sequence of points as it is, the adjoining shape correction amount is averaged for every several points and smoothed, and when it is superposed while discriminating so that it does not exceed the limiter value in which the shape error from the adjoining point or the difference of the shape correction amount exists, the sudden movement of the cutting edge can be avoided. Further, when also the averaged shape correction value itself is discriminated so that it does not exceed the limiter value such as a critical compression depth, it can be prevented that the notching amount of the cutting edge exceeds the critical compression depth during the cutting processing, and the transfer optical surface is brittle fractured.

There is a characteristic also in that, to produce a highly accurate transfer optical surface in the die for molding of the ceramic material or hyper cemented carbide material of the present invention by cutting processing, the shape correction processing to which such limitation of a notching amount is added, is conducted.

In a processing method of the transfer optical surface according to examplary embodiment 23, when the judgment of the goodness or poorness of the processing shape is conducted by finding the error component of each item of the polynomial of Zernike according to the shape error (for example, it corresponds to the difference between the measured shape and ideal shape) and by comparing to a predetermined value, in the invention of an examplary embodiment 22, it is preferable from the following reasons.

To produce the high accurate transfer optical surface by cutting in the die for molding in which the ceramic or cemented carbide is a material, it is described above that, while the limitation of the notching amount being added, when the notching amount proportional to the shape error is superposed, the shape correction processing is conducted. Further, in this shape correction processing, it is described that the shape error or shape correction amount is made as the function. Ordinarily, in order to fit the change amount of the circular aperture such as the wave-front aberration of the optical element, the polynomial of Zernike is used. This is a kind of Fourier expansion expressed by the polar coordinates as shown in the following expression (6), and it makes an orthogonal expand to the axial symmetrical component to the center (optical axis) of the optical surface, or to the component having the periodicity in the rotation around the optical axis, and is approximated, and by the size of the component, the characteristic of the change amount can be expressed.

In the shape error generated by the wear of the cutting tool, because, in the machining, the shape error is generated axial symmetrically, the sectional shape error is found by the sectional shape measurement of the transfer optical surface, and it is regarded that the sectional error is generated axial symmetrically, and the approximate fitting is conducted by using only axial symmetrical component by which the displacement amount is expressed by only radial direction coordinate R of Zelnike's polynomial. In the case of cutting processing, because the shape error is generated comparatively gently, it can be finely approximated by only components up to the 7-th order shown below.

The first axial symmetry coefficient:

$\sqrt{3}(2R^2-1)$

The third axial symmetry coefficient:

$\sqrt{5}(6R^4-6R^2+1)$

The fifth axial symmetry coefficient:

$\sqrt{7}(20R^6-30R^4+12R^2-1)$

The seventh axial symmetry coefficient:

$$3(70R^8-140R^6+90R^4-20R^2+1) \qquad (6)$$

In the case where the shape error which is function-approximated in such a manner, is correction processed by being coped with the notching amount of the tool cutting edge by 1 to 1, when the shape error is in the direction in which the notching amount is reduced, it is reversed to the direction in which a deep notching is conducted, and the correction amount is superposed on the program of the axial motion of the processing. When the shape correction amount exceeds the limiter value such as, for example, the critical compression depth, the shape correction amount is corrected so as to be the limiter value even at the maximum. Accordingly, a part whose shape correction amount is large, in other words, whose shape error is large, is gradually corrected by dividing into a plurality of times of the shape correction processing. That is, it is important that the shape error of the processed surface is reduced as small as possible before the shape correction processing is conducted, in a point that the times of the shape correction processing are reduced, and the good efficient and high accurate transfer optical surface shape is produced.

Further, in the measurement of the shape, when the shape error of the transfer optical surface to be processed, is obtained not in the sectional shape, but, over the entire surface of the transfer optical surface, all components up to 7-th order of Zelnike's polynomial are used and the approximate fitting may also be conducted. In this manner, when the shape correction processing is conducted, the high accurate transfer optical surface shape can be efficiently produced on the die for molding of the ceramic material or cemented carbide material by the cutting processing.

A processing method of the transfer optical surface according to examplary embodiment 24 is preferable, in the invention of any one of examplary embodiments 1 to 23, when the optical element molding use die is attached to the rotational axis of the processing machine which conducts the cutting processing, and in the processing process, the shape of the transfer optical surface can be measured without being dismounted from the rotational axis.

In the conventional grinding process or the cutting processing of the soft material such as the electroless nickel plating, when the shape measurement of the transfer optical surface is conducted by processing while the die for molding is attached to the processing machine, because the processing can not be conducted during the measurement and the processing machine is occupied, the actual operation rate of the processing machine is lowered. Accordingly, when, normally, the shape measurement of the transfer optical surface is conducted, it is a good efficient processing method that the die for molding is dismounted from the processing machine and the processed shape is measured by a separately arranged shape measuring device, and to the processing machine, the next die for molding is attached and the processing is advanced during that time. Actually, in the conventional grinding processing or cutting processing, because the notching amount of the cutting edge is large and not smaller than 1 µm, after the die for molding is dismounted from the processing machine and the shape measurement is conducted, or even when it is attached to the processing machine, because the eccentricity can be suppressed to about 1 µm within about 20 seconds in the time, it is not a factor that the efficiency of the processing is lowered. In other words, conventionally, in order to conduct the processed shape measurement without the die for molding being not dismounted from the processing machine, a machine in which the shape measurement device is arranged on the processing machine, is put in a market, however, from this reason, practically, it has almost no meaning.

In the processing of the present invention, because the cutting processing is conducted in the ductile mode in which the notching amount of the tool cutting edge is very small, when every time of the measurement the die for molding which is a work piece, is dismounted from the processing machine, there is a possibility that the eccentricity when the die for molding is attached to the processing machine to conduct again the shape correction processing is generated, thereby, there is a possibility that a disadvantage such as the lowering of the processing efficiency of the optical transfer surface is brought. Particularly, in the case of the die for molding having deep transfer optical surface, even when there is about 1 µm attaching eccentricity, because it is also several times of the notching amount to realize a ductile mode, it is necessary that at least at several times, in order to eliminate the deviation of the notching amount, the useless cutting processing is conducted. Accordingly, in the present cutting processing, a point that the shape correction processing is conducted while the die for molding is attached as long as possible, is important to realize the generation of the good efficient and high accurate transfer optical surface. That is, in order to enable to conduct the shape measurement of the processed surface in the situation that the die for molding is attached to the processing machine, it is preferable when the shape measuring device is arranged on the processing machine.

When the above description is summed up, in order to cutting process a highly accurate transfer optical surface on the die for molding of the ceramic material or cemented carbide material, without the die for molding being dismounted, the cutting processing shape is measured on the machine, and based on the shape error, the shape correction amount adjusted to the notching amount of the tool cutting edge of which the ductile mode is formed, is found, and when the correction shape processing is conducted, the generation of the good efficient transfer optical surface by which the processing time is short and the number of tools for processing the transfer optical surface is also increased, can be realized. Further, for the shape error or approximation fitting of the shape correction amount, when the polynomial of Zernike is used, and the correction processing is conducted by the coefficient value for each its component, the effect of the correction or the influence which affects the optical performance of the molded optical element can be presumed, and it is effective. As such a measuring device, a measuring device in which, for example, the laser light is irradiated on the processed optical transfer surface and by the reflected light, the shape of the transfer optical surface is measured, or a measuring device which is a tracer type, and in which the processed transfer optical surface is profiled by the axial motion of the processing machine and measured, can be used.

In a processing method of the transfer optical surface according to examplary embodiment 25, in any invention of examplary embodiments 1-24, it is preferable that the optical element molding use die is a molding use die for molding the optical element whose raw material is plastic, and when the transfer optical surface is a surface for transferring the optical surface of the optical element.

In a processing method of the transfer optical surface according to examplary embodiment 26, in any invention of examplary embodiments 1-24, it is preferable that the optical element molding use die is a molding use die for molding the optical element whose raw material is glass, and when the transfer optical surface is a surface for transferring the optical surface of the optical element.

In a processing method of the transfer optical surface according to examplary embodiment 27, in any invention of examplary embodiments 1-26, it is preferable when at least the material of the transfer optical surface to be cutting processed in the optical element molding use die is the cemented carbide.

In a processing method of the transfer optical surface according to examplary embodiment 28, in any invention of examplary embodiments 1-26, it is preferable when at least the material of the transfer optical surface to be cutting processed in the optical element molding use die is the ceramic.

A processing method of the transfer optical surface according to examplary embodiment 29 is preferable, in the invention of an examplary embodiment 28, when the ceramic material of the transfer optical surface to be cutting processed is silicon carbide.

A processing method of the transfer optical surface according to examplary embodiment 30 is preferable, in the invention of an examplary embodiment 29, when the ceramic material of the transfer optical surface to be cutting processed is the silicon carbide produced by CVD.

In a processing method of the transfer optical surface according to examplary embodiment 31, in any one of inventions of examplary embodiments 1-30, when the transfer optical surface is polishing processed after the cutting processing, the finishing of the transfer optical surface can be finely conducted. Hereupon, it is arbitrary that the transfer optical surface is rough grinding processed before the cutting processing.

A processing machine according to examplary embodiment 32 is preferable when it is used for the processing method of the transfer optical surface written in any one of examplary embodiments items 1-31.

An optical element molding use die according to examplary embodiment 33 is preferable when it is formed by the processing method of the transfer optical surface written in any one of examplary embodiments 1-31.

A diamond tool according to examplary embodiment 34 is a diamond tool structured by the diamond having a cutting face faced the forward direction in the cutting direction at the time of processing, and a flank faced the backward direction in the cutting direction, to the transfer optical surface of the optical element molding use die to be cut, and which is characterized in that: the cutting face is made the (110) surface of the diamond, and the transfer optical surface of the optical element molding use die is cutting processed while it is relatively moved to the cutting face, along the (110) surface of the diamond which exists in the direction crossing the cutting face. The effect of the present invention is the same as the invention according to examplary embodiment 11.

A diamond tool according to examplary embodiment 35 is a diamond tool structured by the diamond having a cutting face faced the forward direction in the cutting direction at the time of processing, and a flank faced the backward direction in the cutting direction, to the transfer optical surface of the optical element molding use die to be cut, and which is characterized in that: the cutting face is made the (110) surface of the diamond, and the transfer optical surface of the optical element molding use die is cutting processed while it is relatively moved to the cutting face, in the angle range of ±15° to the (110) surface of the diamond which exists in the direction crossing the cutting face. The effect of the present invention is the same as the invention according to examplary embodiment 12.

A diamond tool according to examplary embodiment 36 is a diamond tool structured by the diamond having a cutting face faced the forward direction in the cutting direction at the time of processing, and a flank faced the backward direction in the cutting direction, to the transfer optical surface of the optical element molding use die to be cut, and which is characterized in that: the cutting face is made the (110) surface of the diamond, and the transfer optical surface of the optical element molding use die is cutting processed while it is relatively moved to the cutting face, along the (100) surface of the diamond which exists in the direction crossing the cutting face. The effect of the present invention is the same as the invention according to examplary embodiment 13.

A diamond tool according to examplary embodiment 35 is a diamond tool structured by the diamond having a cutting face faced the forward direction in the cutting direction at the time of processing, and a flank faced the backward direction in the cutting direction, to the transfer optical surface of the optical element molding use die to be cut, and which is characterized in that: the cutting face is made the (110) surface of the diamond, and the transfer optical surface of the optical element molding use die is cutting processed while it is relatively moved to the cutting face, in the angle range of ±15° to the (100) surface of the diamond which exists in the direction crossing the cutting face. The effect of the present invention is the same as the invention according to examplary embodiment 14.

A diamond tool according to examplary embodiment 37 is a diamond tool structured by the diamond having a cutting face faced the forward direction in the cutting direction at the time of processing, and a flank faced the backward direction in the cuffing direction, to the transfer optical surface of the optical element molding use die to be cut, and which is characterized in that: the transfer optical surface of the optical element molding use die is cutting processed while it is relatively moved to the cutting face, along the (111) surface of the diamond. The effect of the present invention is the same as the invention according to examplary embodiment 15.

A diamond tool according to examplary embodiment 39 is a diamond tool structured by the diamond having a cutting face faced the forward direction in the cuffing direction at the time of processing, and a flank faced the backward direction in the cuffing direction, to the transfer optical surface of the optical element molding use die to be cut, and which is characterized in that: the transfer optical surface of the optical element molding use die is cuffing processed while it is relatively moved to the cuffing face, in the angle range of ±15° to the (111) surface of the diamond. The effect of the present invention is the same as the invention according to examplary embodiment 16.

Figure 7:
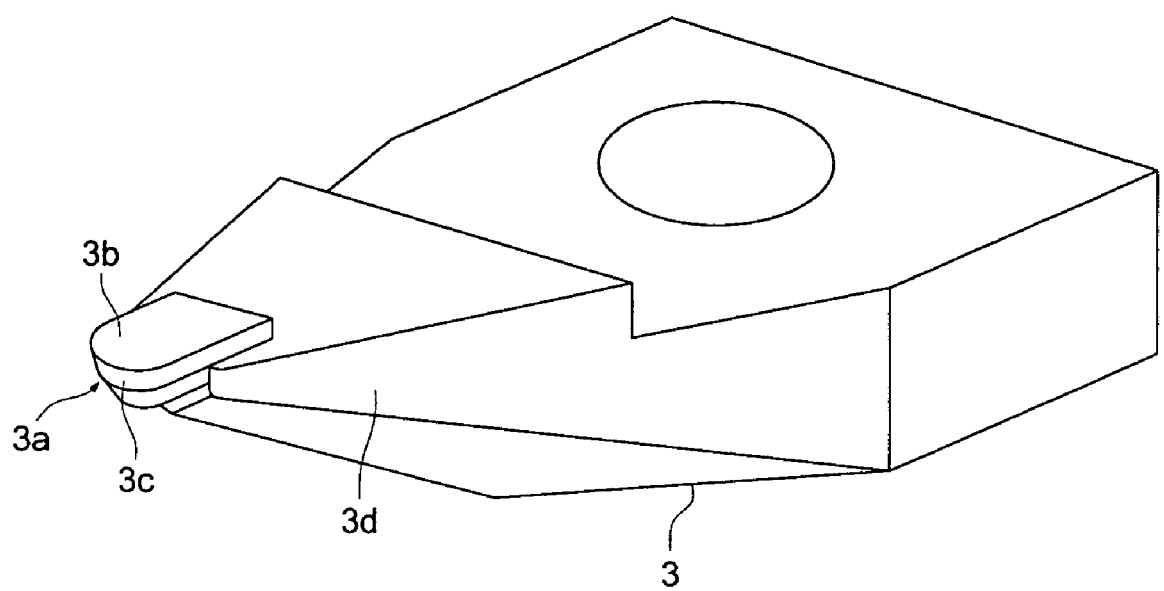
FIG. 7 is a perspective view of a diamond tool used for the hyper precision processing machine in FIG. 6.

Referring to the drawings, the embodiment of the present invention will be described below. A processing method of the transfer optical surface according to the embodiment of the present invention can be conducted by a hyper precision processing machine in FIG. 6. In FIG. 6, an X-axis table 2 driven in the X-axis direction by a control device, not shown, is arranged on a pedestal 1. On the X-axis table 2, a diamond tool 3 whose perspective view is shown in FIG. 7, is fitted. Further, a Z-axis table 4 driven by a control device, not shown, is arranged on the pedestal 1. On the Z-axis table, a main axis (rotational axis) 5 which is rotated by the control device, not shown, is fitted. The main axis 5 can be fitted with the optical element molding use die having the transfer optical surface to be processed (not shown in FIG. 6). A diamond tool 3 which is a cutting tool is fitted with a diamond chip 3a on its tip. Hereupon, herein, numeral 3b structures a cutting face, 3c structures a flank, and 3d structures a shank, and at the time of processing, the cutting face 3b is held in the almost perpendicular direction, and cutting processing is conducted when both are relatively moved in the normal line direction of the cutting face. In this case, the surface to be cut and the flank 3c are held at the angle of 5°-10°.

According to the processing method of the transfer optical surface according to the present embodiment, By using a hyper precision processing machine in which the rigidity of the main axis 5 and the X and Z-axis table 2, 4 is very high, and the axis control resolving power is not larger than 100 nm, the optical element molding use die which is a work piece, is attached to the main axis 5, and by a diamond tool 3, when it is cutting processed in the ductile mode, in such a manner that the cutting point of the cutting edge is continuously moved during the processing, the transfer optical surface having the curvature such as the aspheric surface shape can be produced. On the surface not having the curvature such as a plane, it is not necessary to conduct a plurality of axial motions, and by a single-axis processing machine, because the ductile mode cutting can be conducted comparatively easily by a flat bite, the difficulty is low as the shape generation, and further, because the degree of the use of the molded optical element is low, it can be said that the effect of the present embodiment is small. The present embodiment has a large effect as can be clearly seen in the following examples, when, on the difficult processing material such as the cemented carbide material or ceramic material particularly whose hardness is high and brittle fracture value is small, the transfer optical surface having the curvature such as an aspheric surface shape is high accurately produced.

EXAMPLE 1

The processing of the transfer optical surface of the die for molding of the optical element having the aspheric surface optical surface coefficient shown in table 3 and the external shape shown in FIG. 1, is conducted by the processing method of the present embodiment. The shape on the die for molding of this aspheric surface optical surface is, as can be seen from FIG. 1, a concave shape whose depth is larger than a half of the effective diameter, and whose depth is deeper than a hemi-sphere.

TABLE 3

| Optical effective diameter | φ 3.0 mm |
| Depth | Concave 1.62 mm |
| Center R | 1.22121 |
| Conical constant k | −0.682735 |
| Term A4 | $0.175154 \times 10^{-1}$ |

TABLE 3-continued

| Term A6 | $0.240932 \times 10^{-2}$ |
| Term A8 | $0.204531 \times 10^{-2}$ |
| Term A10 | $0.653289 \times 10^{-3}$ |
| Term A12 | $-0.48930 \times 10^{-3}$ |
| Term A14 | $-0.827296 \times 10^{-4}$ |
| Term A16 | $0.149693 \times 10^{-3}$ |
| Term A18 | $0.330066 \times 10^{-4}$ |
| Term A20 | $-0.275518 \times 10^{-4}$ |

Initially, a portion which is to be the transfer optical surface of the die material of the powder-sintered SIC, is roughly cut into the approximate spherical shape of the transfer optical surface by the grinding processing, and CVD-SiC is formed in 500 μm thick, and a bare surface of fine optical surface is formed. On this CVD-SiC surface, the aspheric surface optical surface shape expressed by numerals shown in Table 3, by using the grinding stone on which the diamond abrasive grain is nickel electro-coated, by a general use high accuracy processing machine whose axial resolving power is about 100 nm, is roughly grinding processed, and the aspheric surface optical surface shape is produced into the shape accuracy of 1 μm. As a matter of course, because this grinding processing is not the ductile mode, the surface roughness of the processed surface is about Rz 1-2 μm, it does not become an optical mirror surface. However, as a pre-processing stage of the finishing cutting processing by the diamond tool, because the electro-coating grinding stone is used, a very small grinding stone diameter is easily produced, and because the largeness of the diamond abrasive grain is not larger than # 1000, and considerably large, and it is securely electro-coating fixed, the cutting edge is stable, and the condition is not easily changed during the processing. Accordingly, in the same setting, the blank of the die for molding can be successively roughly grinding processed with the same quality, and in a short period of time, the rough cutting processing of the aspheric surface shape optical surface of a large amount of the die for molding can be conducted. In the case of the present example, the time of the rough cutting grinding processing including the preparing process is 30 minutes.

Figure 13:
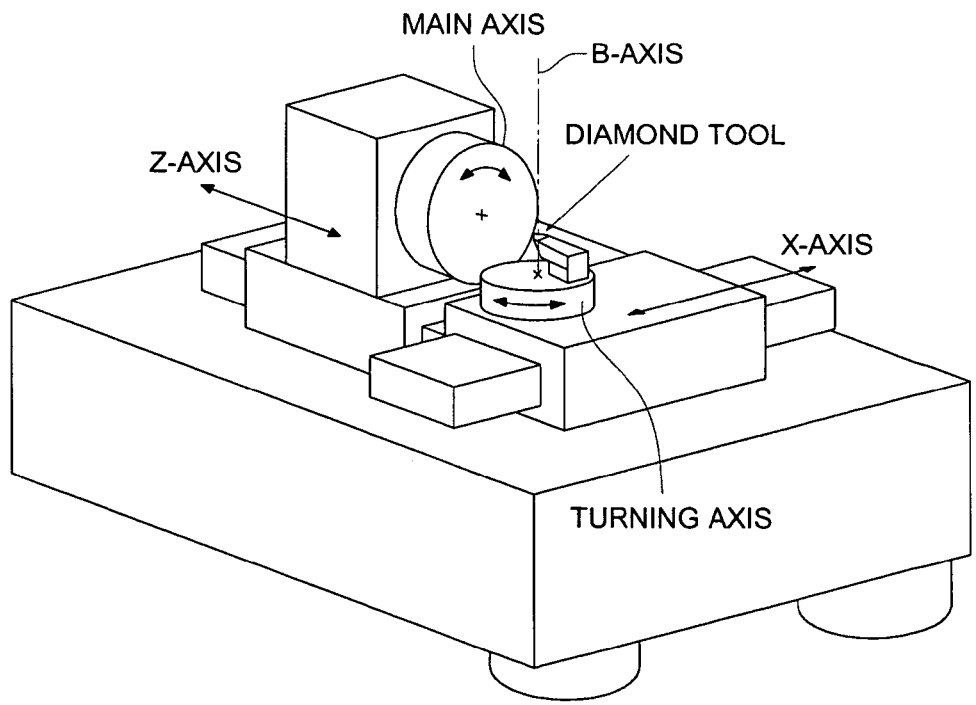
FIG. 13 is a perspective view of 3-axis hyper precision processing machine by which the processing method of the transfer optical surface according to the embodiment of the present invention can be conducted.

Next, the rough cutting produced aspheric surface optical surface shape is generated in such a manner that the die for molding is attached to the main axis by the high rigidity hyper precision 3-axis lathe of, in the axis resolving power 1 nm, the main axis rigidity 1000 N/μm, slide table rigidity 1000 N/μm, B axis radial rigidity 300 N/μm, B axis turning angle accuracy 0.01 sec, shown in FIG. 13, and by using the diamond tool, by the ductile mode cutting, the transfer optical surface is finishing processed. This diamond tool is, in the cutting face of the cutting edge, a rake angle is 0°, the crystal orientation of the cutting face is (110) surface, and in the flank, the clearance angle is 5°, and the crystal orientation of the front cutting face is about (110) surface, however, it is inclined from (110) surface by 5° of the clearance angle. However, the cutting direction in which the cutting surface is rubbed with the cutting edge, is vertical to the <110> orientation, and the abrasion resistance is increased.

The processing is conducted under the condition that the cutting face radius of the tool cutting edge is 0.5 mm, notching amount is 100 nm, and feed speed is 0.2 mm/mm. The cutting time of one time is about 10 minutes, and at the time point at which the processing is conducted 10 times, the rough cutting grinding processing surface can be removed, and the optical mirror surface can be produced. At this time point, the shape of the processed surface is measured, the error from the ideal shape is found, and the correction processing by which the notching amount of the tool is continuously increased or decreased so as to correct it depending on the processing position, is conducted. Specifically, an error amount measured in the shape measurement of the transfer optical surface is fitted by the continuous polynomial and the shape error is expressed, by Zernike's polynomial development equation which is generally used in the wave-front aberration analysis of the optical element, and a value of the coefficient of each term is found. Because when there is the coefficient value up to the order of about 9-th order or so, the error shape can be expressed with enough accuracy, the axial motion whose magnitude is the same as the error amount and whose direction is reversal, is superposed on the NC program of the processing machine, and the notching amount of the tool is corrected so that the notching amount can continuously correct the error, and the processing is conducted. In this correction concept, as described above, in the cutting processing in which the tool cutting edge is not almost elastically deformed, it is used that the notching amount of the cutting edge and the removal depth correspond in about 1 to 1, and it is a correction method whose reproducibility is very high. A sequential time of this shape correction processing is 15 minutes per one time, and at the time point at which 4 times processing are conducted, the shape error of the processed transfer optical surface is decreased to not larger than 50 nm as shown in FIG. 2, and because it enters into the desired tolerance, the cutting processing is completed.

In the aspheric surface shape measurement result of the cutting processing surface in FIG. 2, the horizontal axis shows the coordinate of the diameter direction of the transfer optical surface, the center is an optical axis position of the aspheric surface shape, the vertical axis expresses the shape error amount to the ideal shape, and expresses that, as it is near to 0, it is close to the ideal shape. The reason that there are 2 graphs of the shape measurement result, is because the result in which the transfer optical surface is measured from 2 directions which passes the center of the transfer optical surface and perpendicularly crosses, is simultaneously displayed, thereby, it can be seen that there is almost no nonaxis-symmetric error components in the processed shape. As can be seen from this result, it can be seen that the processed shape error is not larger than 50 nm at the maximum, and sufficiently high accurately the aspheric surface optical surface shape can be produced.

Figure 3:
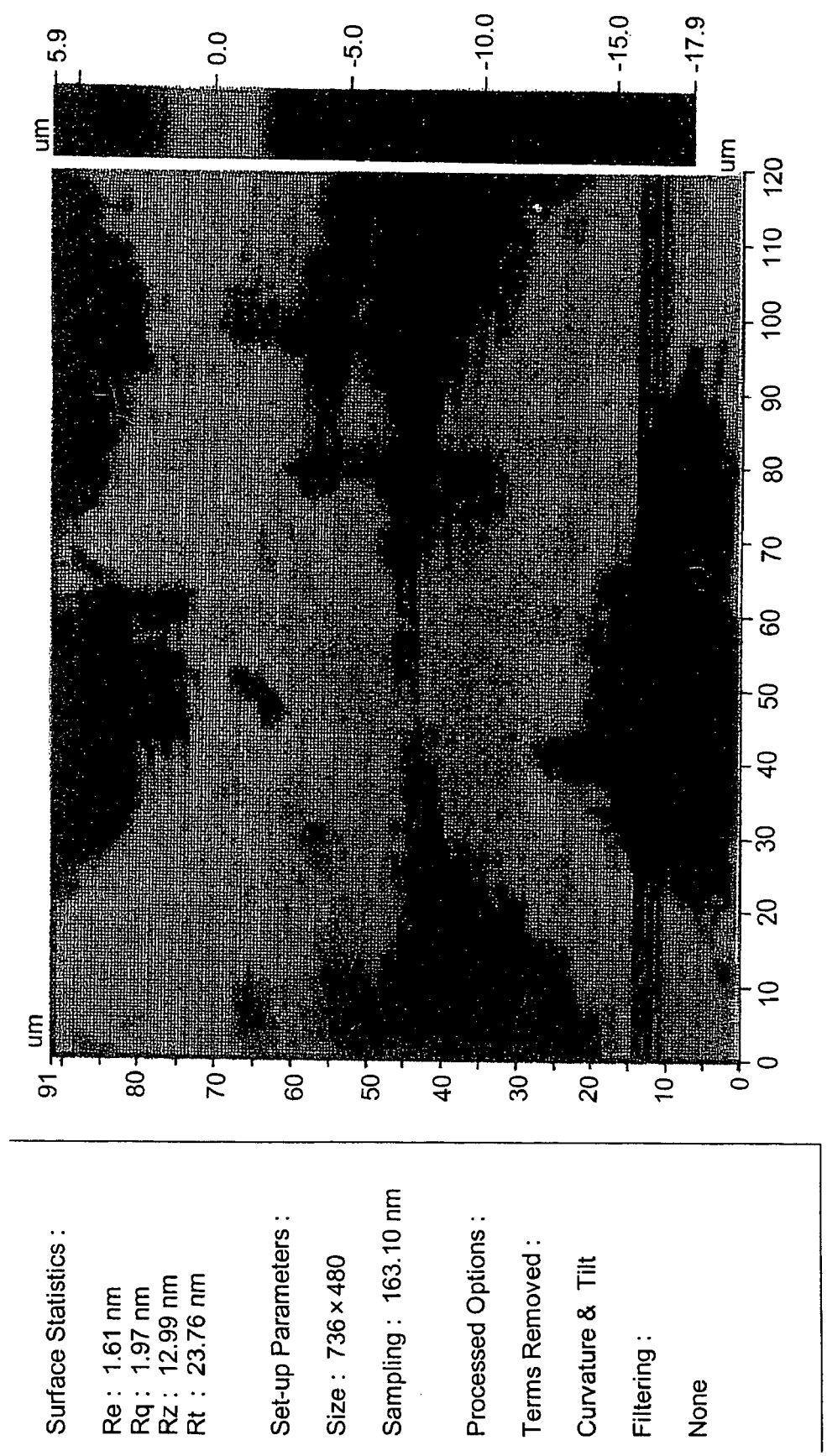
FIG. 3 is a view showing the roughness of the transfer optical surface of the optical element molding use die produced by the present inventor.
Figure 4:
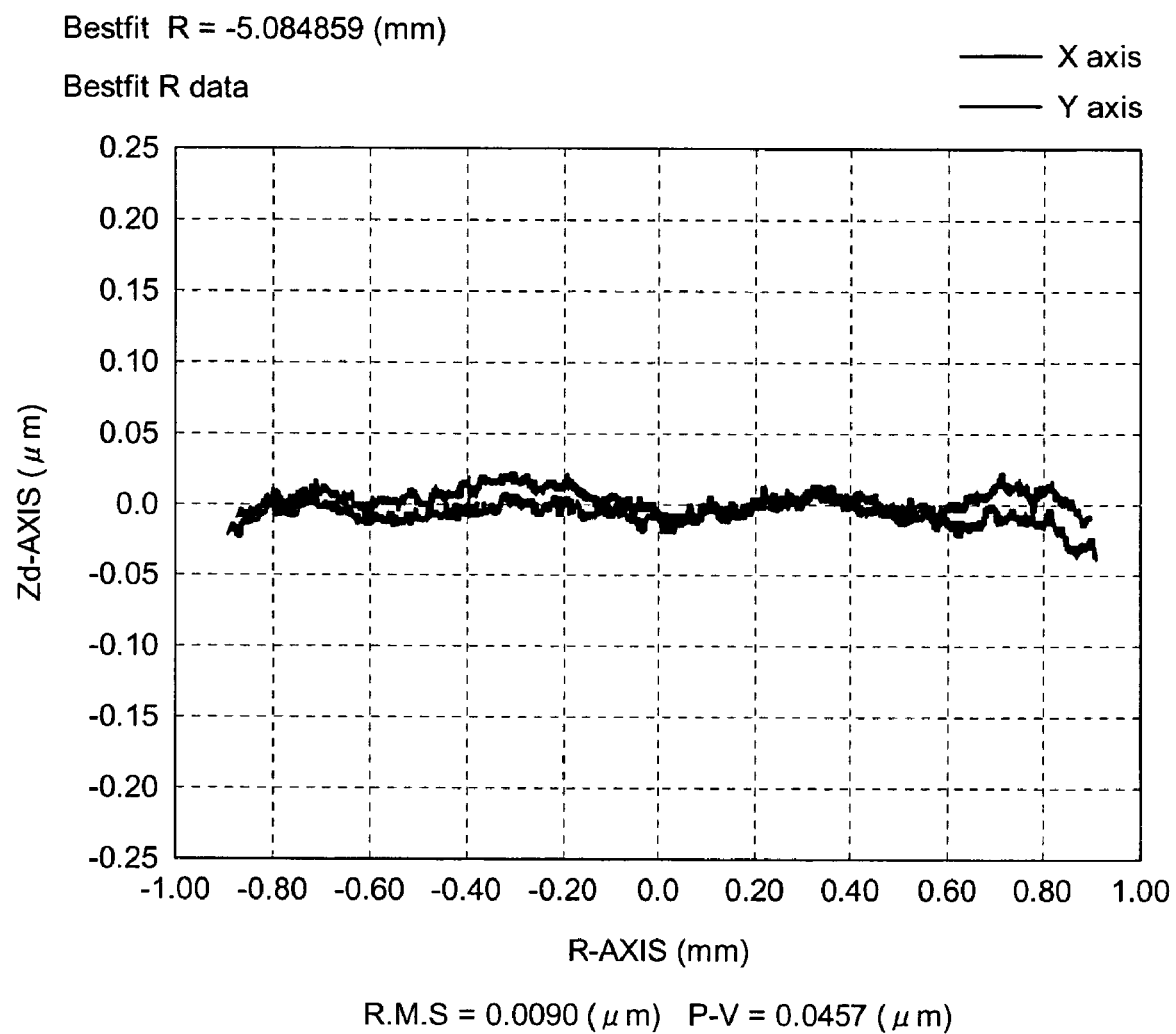
FIG. 4 is a view showing an error of the shape of the transfer optical surface of the optical element molding use die produced by the present inventor.
Figure 5:
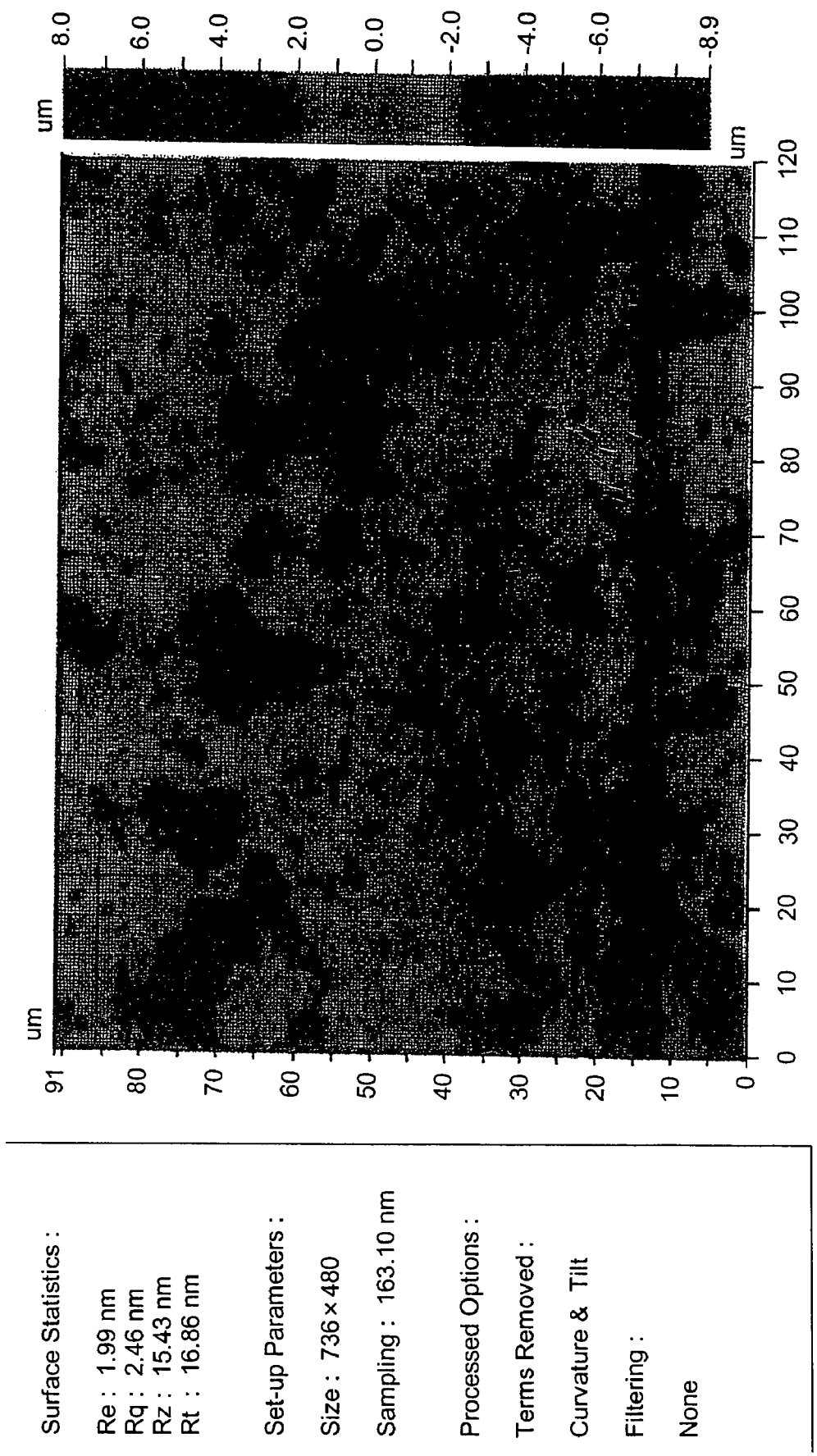
FIG. 5 is a view showing a roughness of the transfer optical surface of the optical element molding use die produced by the present inventor.

In FIG. 3, the surface roughness of this transfer optical surface is measured, and a very fine mirror surface property of Rz 12.99 nm is shown, and it can be sufficiently used as the transfer optical surface of the die for molding even as it is. However, because a periodical cutter mark of the depth of about 2 nm is seen, by the diamond compound, it is polished by the hand work for about 5 minutes, and removed. The shape measurement result after the polishing is shown in FIG. 4, and the surface roughness is shown in FIG. 5. The aspheric surface shape keeps the axial symmetry property, the break of the shape is not quite generated, and the surface roughness is slightly deteriorated to Rz 15. 43 nm. However, it can be seen that the cutter mark is perfectly eliminated, and the surface roughness becomes uniform. From this, it can be seen that, in the cutting processing of the present invention, by the grinding in the very short time, the surface roughness of about Rz 15 nm can be easily attained without breaking the processed shape, and the polished shape is quite different from the case where a scratch or chatter mark whose depth is from several 100 nms to near 1 μm, is removed by the polishing as in the grinding processing.

As described above, even the transfer optical surface of the optical element molding use die whose material is silicon carbide, in which it is considered that the critical compression depth is smallest in the ceramic material in Table 1, (processing point is easily brittle fractured) and the processing difficulty is high, by the cutting processing of the present invention, the high accurate aspheric shape and the surface roughness can be realized in a short period of time.

Hereupon, it is studied what occurs when the transfer optical surface is produced on the silicon carbide material by this CVD, by the grinding processing as in the conventional manner. The center R of this concave transfer optical surface is, as shown in Table 3, 1.22121 mm. That is, in order to grinding process the central portion of the transfer optical surface, it is necessary that the radius of grinding stone is sufficiently smaller than 1.22121 mm. Accordingly, the diameter of the grinding stone is about 2.4 mm in the maximum. In the grinding processing, in order to efficiently conduct the removal processing when the cutting edge sufficiently cuts-in the material to be grounded, it is necessary that the grinding stone is brought into contact with the work piece at the some degree of high speed, and that the general processing peripheral speed in the transfer optical surface production is not smaller than 500 m/min. For the purpose that the 2.4 mm diameter grinding stone satisfies this condition, the rotation of 6600 rpm is necessary, and a high cost high frequency spindle is necessary. That is, it is because the grinding processing is conducted when the die for molding is rotated around its optical axis and the grinding stone is brought into contact with it at high speed rotation, however, because the shape of the surface to be processed is concave shape whose depth is deeper than the hemi-sphere as described above, in the arrangement in which the grinding stone axis is orthogonal to the rotation axis of the die, however thin the grinding stone axis is reduced, the peripheral side of the transfer optical surface is brought into contact with it. Therefore, only the arrangement in which the grinding stone axis has an angle obliquely to the rotation axis of the die, is allowed. In this arrangement, because the processing point on the pedestal is out of the optical axis by the wear of grinding stone, the central portion of the die is remained without being processed. When a mere 2.4 mm diameter grinding stone is rotated at 66000 rpm, and the die material of the CVD silicon carbide whose hardness is very high even in the ceramic material, is processed in the notching amount of 100 nm, because the grinding stone is simply worn and not only the radius of the grinding stone is changed, but also the processing point on the pedestal is moved, it is necessary to conduct the shape production processing while the very complicated correction is conducted at all times. Furthermore, because the grinding stone is small, the grinding condition is not stabilized, and the effect of such a correction processing is not also clearly shown.

Figure 8:
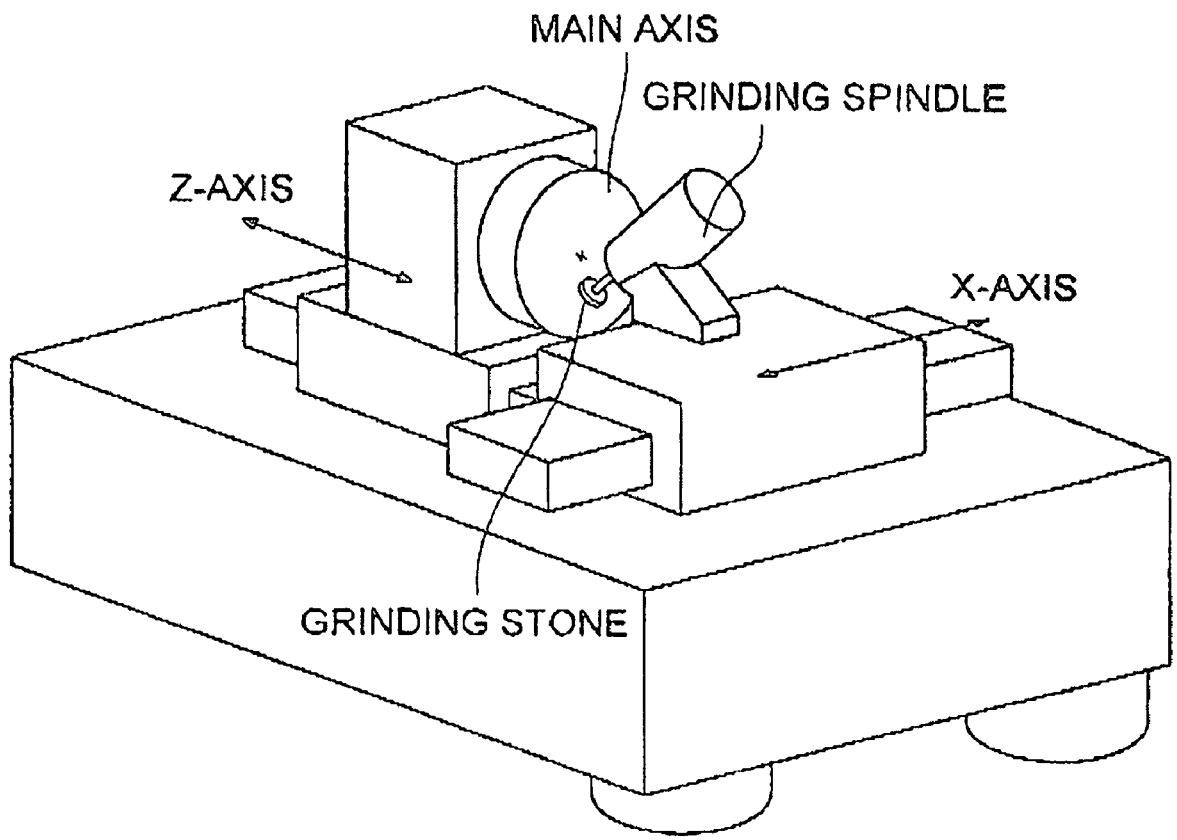
FIG. 8 is a perspective view of a grinding processing apparatus.

Actually, under such a condition, by using the optical surface grinding apparatus shown in FIG. 8, a situation in which the production processing of the aspheric surface optical surface shape is conducted, is shown bellow. In the grinding stone, the diamond is used for the abrasion grain, however, the binding material is the metal bond, because the life of grinding stone can be seldom expected in resin.

Initially, the diameter of the grinding stone axis by which the grinding stone is fixed, can not be increased only to about 1.5 mm because the grinding stone diameter is 2.4 mm and small. Therefore, the grinding stone shaft is easily deflected by the grinding resistance during grinding processing, the vibration like that the processing surface is tapped, is generated, and a large number of chatter marks are generated on the processed surface. Further, the condition of the cutting edge of the grinding stone is not stabilized, and the condition that it can be comparatively finely ground, is not continued only 1-2 times. Therefore, although the abrasive-ness of the grinding stone is increased by the single stone diamond, because the grinding stone diameter is soon decreased thereby, the life of the grinding stone is very short, and the grinding stone is replaced 4 times in one die processing. Further, by the movement of the processing point by the wear of the grinding stone, because the no-processed portion is generated in the die central portion, the movement amount of the processing point is calculated from the diameter of the no-processed portion and corrected, and the processing point is made to pass through the die center, however, the no-processed portion is not always eliminated, and the reproducibility of the correction processing itself is scarce. Finally, as the result of the grinding processing for 12 hours, the shape accuracy of the processed surface is 240 nm, and the surface roughness is Rz 126 nm, and on the surface, there are numerous chatter marks and scratches. For the scratch, it seems to be a factor that because the grinding stone is the metal bond, the elastic deformation amount of the grinding stone is small, and the processing is in the condition near to the compulsory notching. As it stands, because the quality is too low for using as the transfer optical surface, the polishing processing is conducted. For the polishing processing time, the chatter marks and scratches can be removed in 48 minutes by the hand work by using the diamond compound, however, on the transfer optical surface shape after the polishing processing, the shape collapse of ir-rotation symmetry of about 50 nm is confirmed.

As described above, when the transfer optical surface shape whose diameter is small and which is deep is produced on the optical element molding use die formed of the ceramic material or cemented carbide material, it can be said that the conventional grinding processing is quite inappropriate, and there is entirely no superiority to the cutting processing.

EXAMPLE 2

Figure 9:
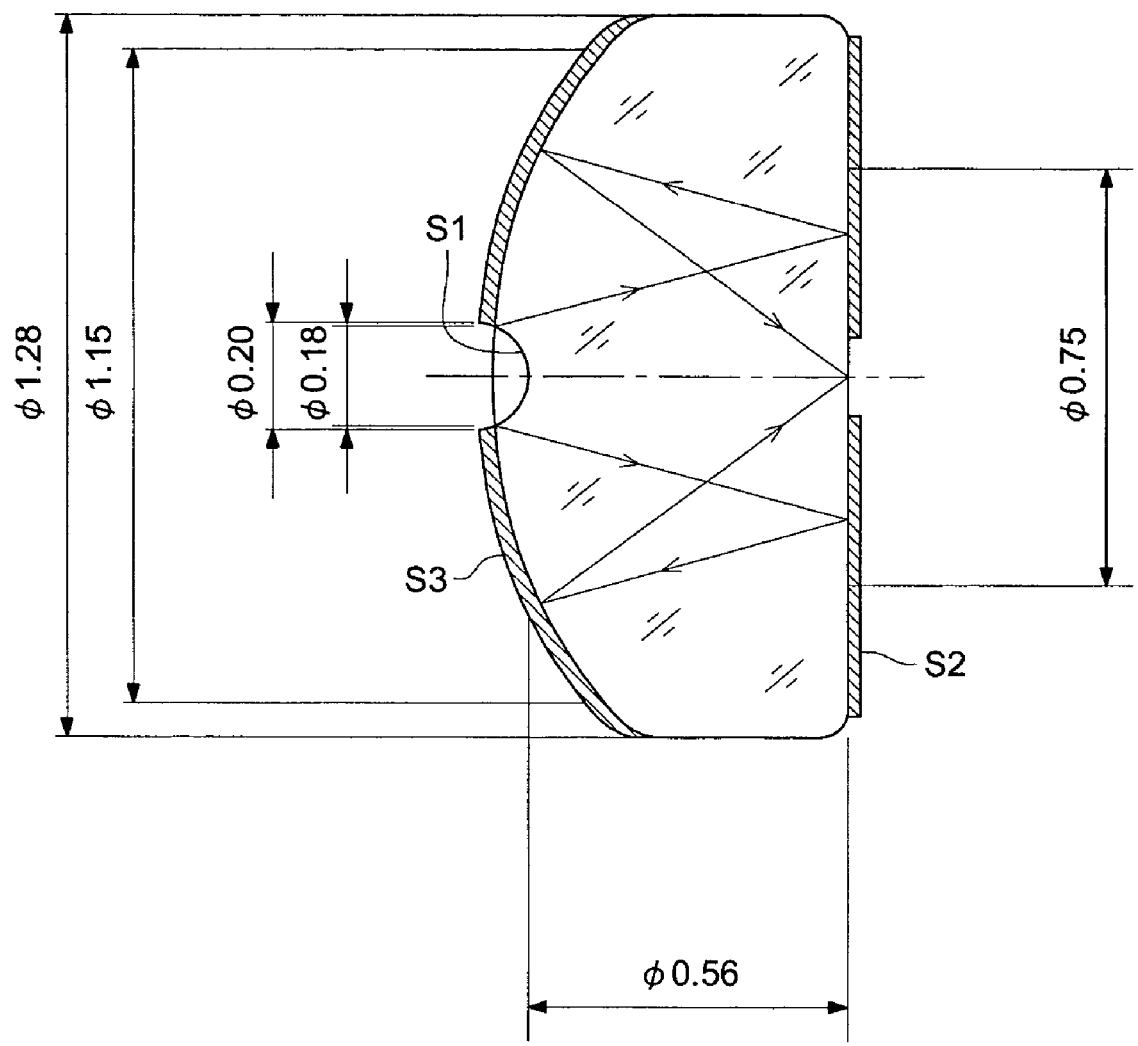
FIG. 9 is a sectional view of an optical element produced by the present inventor.

A glass made optical element whose dimensions are shown in Table 4, and sectional shape is shown in FIG. 9, is made on an experimental basis. This is an objective optical element for conducting the light recording at high density by very small spots, in which, by using the proximity field light which is called SIM (Solid Immersion Mirror), and thereby, the light gathering power in which NA (Numerical Aperture) is not smaller than 1, is realized. Relating to this optical element, because it is detailed in the publicly known documents, the detail is omitted. The 1-st surface S1 on which the parallel light is incident, is the concave aspheric-surface shape shown in Table 5, and on its outer periphery, there is the concave reflection aspheric surface shown in Table 6. Initially, the light flux which passes the 1-st surface S1 and is diverged, is reflected by the 2-nd surface S2 which is a plane on which the reflection coating is conducted, further, the reflected light is reflected by the 3-rd surface S3, and converged on the center of the 2-nd surface S2, however, the reflection coating of the 2-nd surface is not conducted on its central portion, and accordingly, the light flux which is reflected from the 3-rd surface and converged, passes it, and emitted from this optical element.

TABLE 4

| Lens outer diameter | φ 1.3 mm |
|---|---|
| NA | 1.3 |
| Center blocking NA | 0.3 |
| Using wavelength | 660 nm |

TABLE 5

| The 1$^{st}$ surface effective dia. | 0.18 mm |
|---|---|
| Maximum normal line angle | 52.4° |
| Center R | −0.10237 |
| Conical constant k | −0.243819 |
| Term A4 | $0.663334 \times 10^{+1}$ |
| Term A6 | $-0.169955 \times 10^{+3}$ |

TABLE 6

| The 3-rd surface inner side effective diameter | φ 0.22 mm |
|---|---|
| Outer side effective diameter | φ 1.15 mm |
| Maximum normal line angle | 38.3° |
| Center R | 0.9039100 |
| Conical constant k | $-0.6625 \times 10^{-1}$ |
| Term A4 | $-0.109298 \times 10^{-1}$ |
| Term A6 | $-0.989849 \times 10^{-2}$ |
| Term A8 | $-0.44705 \times 10^{-2}$ |
| Term A10 | $-0.325803 \times 10^{-1}$ |

The molding use die for molding this glass made optical element, is produced by the silicon carbide material. Because the 2-nd surface S2 is a plane, after the transfer optical surface of the sintered silicon carbide is plane ground by the general use grinding machine, a film of the silicon carbide is finely formed in 300 μm thickness by CVD. Further, the CVD silicon carbide surface is plane ground at peripheral speed of 1500 m/min by the 250 mm diameter # 2000 diamond grinding stone by the general use plane grinding machine, and further, after it is roughly ground by using the diamond abrasion grain, further by using the colloidal silicon, the precision plane polishing processing is conducted, and the transfer optical surface is produced. In the case where the transfer optical surface shape is a plane, because the large diameter grinding stone can be used, the grain size of the grinding stone or the concentricity, and processing condition are appropriately selected, and when the polishing processing after that is also appropriately conducted, the enough good efficient shape production can be conducted. Further, because, also in the polishing which is after-processing, the shape production can be produced, it is not necessary that the cutting processing of the present invention is positively conducted.

Because, in the 1-st surface S1 which is the convex aspheric surface, and the 3-rd surface S3 which is the concave aspheric surface, the curvature is quite reversal, a case where they are individually divided, produced, and assembled, seems to be easy at first sight. However, the eccentricity tolerance of the 1-st surface S1 and the 3-rd surface S3 is not larger than 1 μm and very severely limited, in order to suppress the generation of the coma not larger than 20 mλ, and in the case where the concentricity of respective optical axes and the outer diameters, or the eccentricity by the engagement gap, is considered, when they are individually divided and produced, it is difficult that the concentricity tolerance is satisfied.

Accordingly, it is advantageous that, on the die for molding of the continuous one part, the transfer optical surface corresponding to the 1-st surface S1 and the 3-rd surface S3 is simultaneous processed, and the concentricity of the transfer optical surface is made almost 0, and it is produced. Accordingly, when it is considered that the transfer optical surface corresponding to the 1-st surface S1 and the 3-rd surface S3 is simultaneous processed by the conventional grinding processing, while it is fitted to the processing machine, the connecting portion of the transfer optical surface corresponding to the 1-st surface S1 and the transfer optical surface corresponding to the 3-rd surface S3, is very narrow depth portion, there is a problem that, when the tool is not sufficiently small, it can not enter into this depth portion, and the processing can not be conducted. The effective diameter of the 1-st surface S1 is φ0.18 mm, and the innermost transfer optical surface end of the 3-rd surface S3 is φ0.22 mm.

Figure 10:
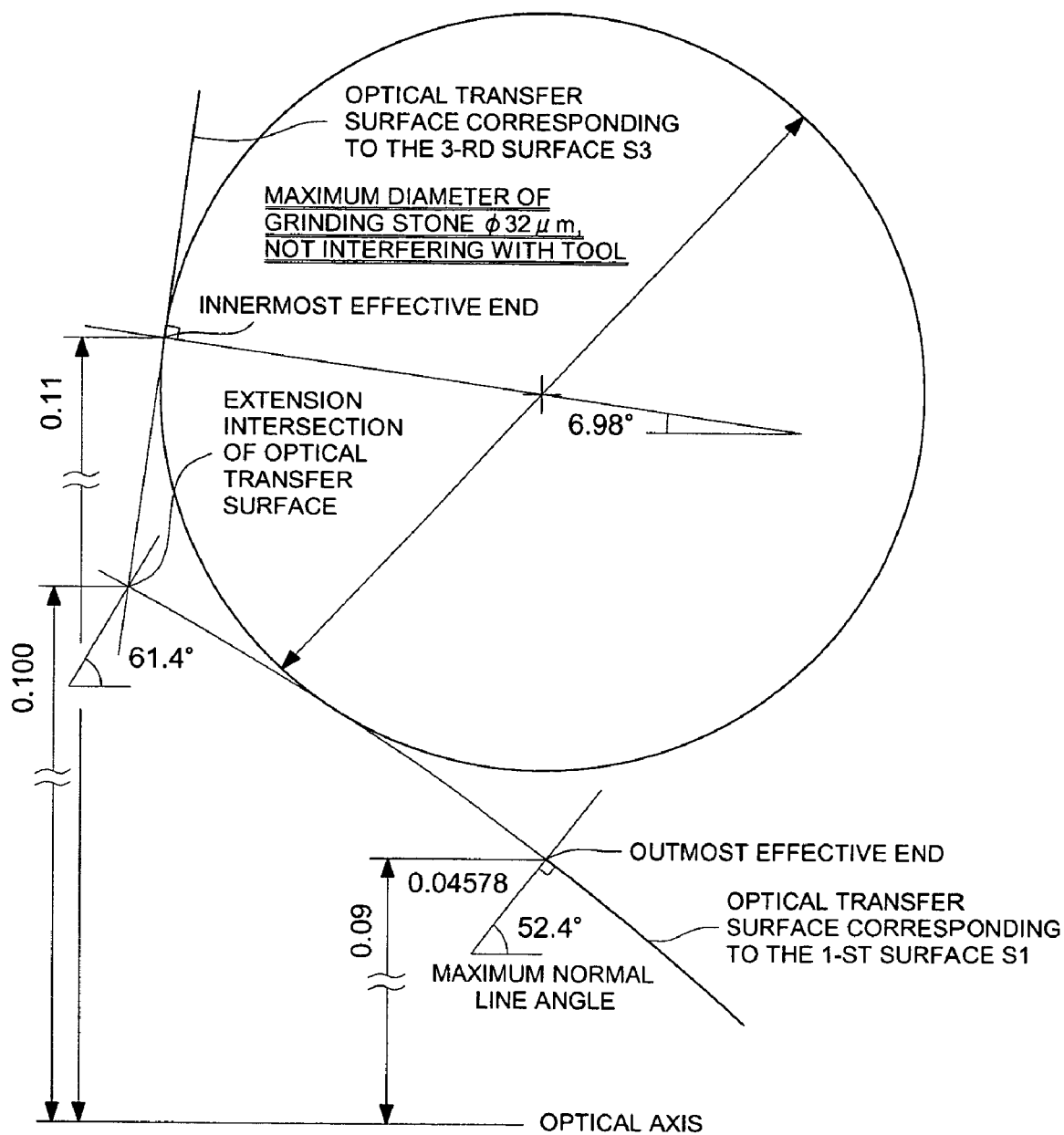
FIG. 10 is a view showing a condition in which the transfer optical surface of the optical element molding use die produced by the present inventor is grinding processed by a grinding stone.

A situation in which the grinding stone is arranged at the portion corresponding to that, and respective transfer optical surfaces are processed, is shown in FIG. 10. The diameter of the grinding stone by which tool interference is not generated, is mere 32 μm. Even when the size of the abrasive gain is reduced, only about several ten pieces can be arranged on the outer periphery. Further, it is necessary that the grinding stone axis diameter to rotate this, is at least not larger than φ20 μm, and the rotation speed of the grinding stone necessary for securing the grinding stone peripheral speed 500 m/min, reaches 5,000,000 rpm. Not only to realize such a grinding condition, much more, to process the die for molding of the CVD silicon carbide, is also impossible.

Further, in such a small transfer optical surface, even when the grinding processing can be conducted, because the scratch or chatter mark generated by the processing is relatively large, it is necessary that they are sufficiently removed by the polishing processing. However, because the polishing processing is the processing by which the whole surface is pressure removal processed on an average while copying after the surface, it is important for advancing the polishing without collapsing the transfer optical surface shape that the gentle continuous surface is polishing processed by the large polishing tool. However, in the present example, not only the transfer optical surface is small, but also the transfer optical surface corresponding to the 1-st surface S1 is the convex shape, and the transfer optical surface corresponding to the 3-rd surface S3 is the concave shape, and because they are discontinuously connected, it is much separated from the condition that the uniform polishing processing is conducted, and it can be said that it is the transfer optical surface shape in which the shape collapsing is easily generated. For example, when the transfer optical surface corresponding to the 1-st surface S1 is polished, in order to polish up to its effective diameter, it is necessary that the size of the polishing tool is several tens micron order, and by such a small polishing tool, the effect to copy after the transfer optical surface is small, and it is very difficult to average the pressure removal on the whole transfer optical surface and to uniformly realize. Further, while the transfer optical surface corresponding to the 1-st surface S1 is polishing processed, when the polishing tool is touched to the transfer optical surface corresponding to the 3-rd surface S3, because the specific position of this transfer optical surface is polishing processed and the shape is collapsed, the greatest careful caution is necessary also on how to move the polishing tool.

As can be seen from above, it can be seen that, by the conventional grinding processing and polishing processing, to produce the transfer optical surface shape of the die for molding of the present example, is very small in the reproducibility, and is difficult.

In view of them, the present inventor produces the transfer optical surface by a 2-axis hyper precision processing machine by the diamond tool of the present invention. The diamond tool used herein is made such that, the radius of the cutting face of the cutting edge is 0.010 mm, the cutting face (110) at the rake angle 0°, and the clearance angle is made 10°, and it is more largely taken than the ordinary one so that the flank does not interfere with the tool, and the front flank is made (110). When this diamond tool is fitted to the processing machine, it is considered that, although the maximum normal line angle of the 1-st surface of the cutting optical surface is 52.4° and large, the effective diameter is very small, and cutting length is short, and the maximum normal line angle of the 3-rd surface in which the cutting length becomes long, is 38.3°, it is off-set (inclined) by 20° to the crystal orientation. Thereby, the whole optical surface of the 3-rd surface S3 is divided at a portion near to left and right 20° to the crystal orientation whose abrasion resistance is the highest, and cutting processed, and the diamond tool is fitted so that the tool wear is as small as possible. Also the rough cutting processing is conducted in the cutting processing, until the shape accuracy is 1 μm, and the finishing processing is conducted in such a manner that, while the above-described correction method is conducted, the cutting processing is conducted 15 times in the notching amount 100 nm. As this result, the processed shape accuracy of the transfer optical surface corresponding to the 1-st surface S1 is not larger than 50 nm, and the processed shape accuracy of the transfer optical surface corresponding to the 3-rd surface S3 is not larger than 80 nm. Further, the processed surface roughness is Rz 20 nm, and it is slightly poor when compared to Example 1, however, it can be enough used as the transfer optical surface of the optical element molding die without polishing processing, and the present inventor can glass-mold the approximate field optical element which can exert the sufficient optical performance over NA1, for the first time in the world, and can realize it, by using the present invention.

Figure 15:
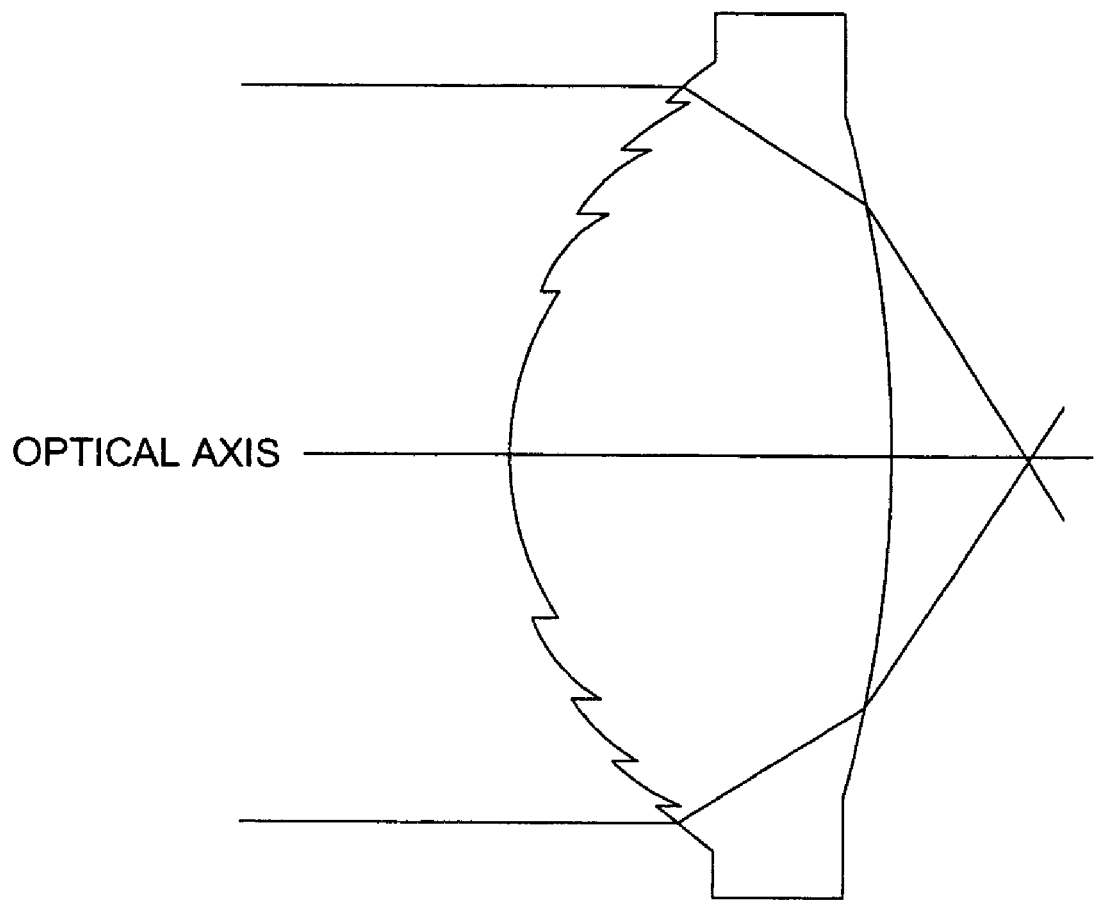
FIG. 15 is a sectional view of a diffractive optical element.

FIG. 15 is a sectional view of a diffractive optical element. The diffractive optical element is an optical element such that sawtooth shaped steps are provided on an optical surface of an optical element, diffraction is generated by varying the phase of a light wave passing there, to utilize the function to deflect the optical path. For a bundle of rays refracted by a basic aspherical shape, by further deflecting the optical path by the effect of diffraction, it can exhibit with a single optical surface a diffraction effect equivalent to that with two optical surfaces. On top of it, an optical path is more difficult to be deflected the longer the wavelength is in the case of refraction, but an optical path through diffraction is more deflected the longer the wavelength is; therefore, the wavelength dependency of refraction can be reduced by combining the both.

For producing such a diffractive optical element having the sawtooth shaped steps, the cutting process of the present invention can be effective applicable.

As described above, according to the present invention, the transfer optical surface shape whose production is almost impossible by the conventional cutting processing and polishing processing, can also be produced and put into the practical use.

What is claimed is:

1. A method of forming a die surface onto a producing die to produce an optical element, wherein the die surface transfers an optical surface onto the produced optical element, the method comprising the steps of:

bringing a cutting tool to come in contact with a material so as to cut the material; and moving the material relatively to the cutting tool so as to form the die surface having a diameter of 5 mm or less with a curvature on the material;

wherein the material is one of a ceramic and a tungsten carbide cobalt alloy and has a hardness not smaller than Rockwell hardness HRA 80 or Vickers hardness Hv 1000 and the cutting step is conducted to cut the material with a cutting-in depth of 1 μm or less, and wherein the cutting tool has a cutting edge capable of coming in contact with the material, the cutting edge comprises a diamond and the cutting step is conducted while the cutting tool is set such that a single point of the cutting edge comes in contact with the material as a cutting point, the cutting point of the cutting edge is fixed at the single point, and a (110) surface of the diamond is used as a rake face at the cutting point.

2. The method of claim 1, wherein the optical surface is an aspherical surface.

3. The method of claim 1, wherein the material is shifted relatively to the cutting edge of the cutting tool comprising the diamond in a direction predetermined on a basis of a crystal orientation of the diamond.

4. The method of claim 3, wherein the rake face faces forward in a cutting direction and a flank faces backward in the cutting direction for the transferring surface to be cut.

5. The method of claim 4, wherein the rake face of the cutting edge has a rake angle within a range of ±15 degrees from a normal line perpendicular to the surface of material to be cut.

6. The method of claim 3, wherein the material is relatively rotated to the cutting edge of the cutting tool around the optical axis of the optical surface to be formed.

7. The method of claim 3, wherein the cutting step is conducted with a hyper precision processing machine having a control resolving power of 100 nm or less for a shaft to hold one of the cutting tool and the transferring die surface so that the position of the shaft is controlled within an error of 100 nm or less.

8. The method of claim 7, wherein the hyper precision processing machine has a moving section movable along 3-axes or more.

9. The method of claim 1, wherein the producing die is a producing die to form an optical element from a plastic material and the transferring surface transfers an optical surface onto the optical element.

10. The method of claim 1, wherein the producing die is a producing die to form an optical element from a glass material and the transferring surface transfers an optical surface onto the optical element.

11. The method of claim 1, wherein the ceramic is a silicon carbide.

12. The method of claim 11, wherein the ceramic is a silicon carbide formed by chemical vapor deposition (CVD).

* * * * *